(12) United States Patent
Morimoto

(10) Patent No.: US 7,500,406 B2
(45) Date of Patent: Mar. 10, 2009

(54) MULTIAXIAL SENSOR

(75) Inventor: Hideo Morimoto, Nara (JP)

(73) Assignee: Nitta Corporation, Osaka (JP)

( * ) Notice: Subject to any disclaimer, the term of this patent is extended or adjusted under 35 U.S.C. 154(b) by 155 days.

(21) Appl. No.: 10/574,253

(22) PCT Filed: Jun. 21, 2004

(86) PCT No.: PCT/JP2004/008719

§ 371 (c)(1),
(2), (4) Date: Mar. 30, 2006

(87) PCT Pub. No.: WO2005/033646

PCT Pub. Date: Apr. 14, 2005

(65) Prior Publication Data

US 2007/0000335 A1 Jan. 4, 2007

(30) Foreign Application Priority Data

Sep. 30, 2003 (JP) ............... 2003-341451

(51) Int. Cl.
G01L 1/22 (2006.01)
G01D 7/02 (2006.01)
G01P 15/12 (2006.01)
(52) U.S. Cl. .................... 73/862.044; 73/862.041; 73/862.045; 73/514.33; 257/419
(58) Field of Classification Search ............ 73/862.041, 73/862.042, 862.043, 862.044, 862.045, 73/514.33, 514.34; 438/53; 257/417, 419
See application file for complete search history.

(56) References Cited

U.S. PATENT DOCUMENTS

| | | | | |
|---|---|---|---|---|
| 3,915,015 A | * | 10/1975 | Crane et al. | 73/865.4 |
| 4,745,812 A | * | 5/1988 | Amazeen et al. | 73/862.041 |
| 5,339,696 A | * | 8/1994 | Carignan | 73/862.041 |
| 5,408,112 A | * | 4/1995 | Tai et al. | 257/254 |
| 5,850,044 A | | 12/1998 | Spletzer | |
| 5,948,996 A | * | 9/1999 | Takeuchi et al. | 73/862.043 |
| 5,959,209 A | * | 9/1999 | Takeuchi et al. | 73/514.34 |
| 6,642,594 B2 | * | 11/2003 | Kurtz | 257/419 |

FOREIGN PATENT DOCUMENTS

JP 54-9074 4/1979

(Continued)

OTHER PUBLICATIONS

English Patent Abstract of JP3216529 from esp@cenet, published Sep. 24, 1991, 1 page.*

(Continued)

*Primary Examiner*—Edward Lefkowitz
*Assistant Examiner*—Punam Patel
(74) *Attorney, Agent, or Firm*—Osha • Liang LLP

(57) ABSTRACT

Cost is reduced by simplifying the wiring while reducing power consumption. A multi-axis sensor unit (10) for measuring any one or more of multi-axis force, moment, acceleration and angular acceleration applied externally, comprising eight strain gauges (R11-R24) arranged on one plane, and one bridge circuit (11) formed by interlinking the strain gauges (R11-R24). As compared with a conventional multi-axis sensor unit, power consumption is reduced by decreasing the number of bridge circuits (11) and the strain gauges (R11-R24), and production cost is lowered by simplifying the wiring.

5 Claims, 20 Drawing Sheets

FOREIGN PATENT DOCUMENTS

| JP | 4-194634 | 7/1992 |
|----|----------|--------|
| JP | 5-52447 | 8/1993 |
| JP | 2581820 | 11/1996 |
| JP | 11-132874 | 5/1999 |
| JP | 2000-172045 | 6/2000 |
| JP | 2005-31062 | 2/2005 |

OTHER PUBLICATIONS

Wiley Encyclopedia of Electrical and Electronics Engineering: Strain Sensors, © 1999 pp. 566-580.*

Supplemental European Search Report dated Jul. 16, 2007 issued in Application No. PCT/JP2004-008719, 3 pages.

English Patent Abstract of JP2000-172045 from esp@cenet, published Jun. 23, 2000, 1 page.

English Patent Abstract of JP4-194634 from esp@cenet, published Jul. 14, 1992, 1 page.

International Search Report for PCT/JP2004/008719 dated Sep. 28, 2004 (2 pages).

English Patent Abstract, Publication No.: JP2005031062, Publication Date: Feb. 3, 2005, 1 page.

* cited by examiner

FIG. 23A                                PRIOR ART
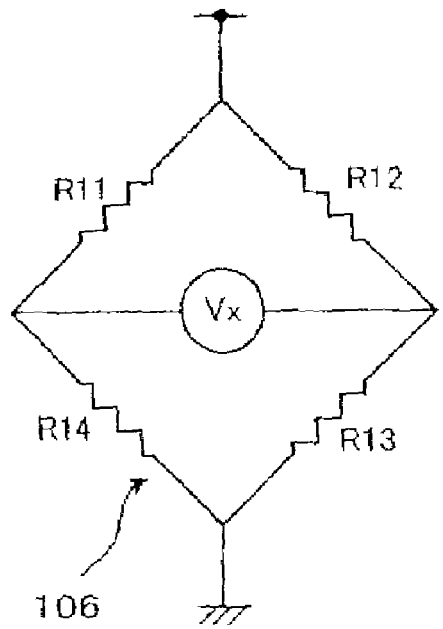
X-axis
FIG. 23B                                PRIOR ART
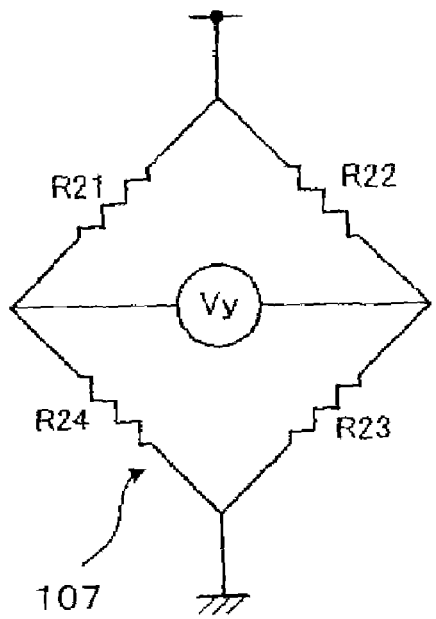
Y-axis

MULTIAXIAL SENSOR

TECHNICAL FIELD

The present invention relates to a multiaxial sensor unit capable of measuring one of multiaxial force, moment, acceleration, and angular acceleration externally applied to a first member and a second member, and also to a multiaxial sensor using the unit.

BACKGROUND ART

As a multiaxial sensor of this kind, a device is known in which a force or moment is detected using a semiconductor single crystal substrate. As shown in FIGS. 21, 22, and 23A to 23C, Patent Document 1 discloses a multiaxial sensor 105 including a strain generation body 103 made up of a force receiving portion 100 provided at the center, a fixed portion 101 provided around the force receiving portion 100, and an annular diaphragm portion 102 connecting the force receiving portion 100 and the fixed portion 101 to each other; and detecting elements R11 to R34 each made of a piezoresistive element and attached to the strain generation body 103.

Detecting elements R11 to R34 are attached to the upper surface of each strain generation body 103. On the upper surface of each strain generation body 103, there are set X- and Y-axes extending perpendicularly to each other with the force receiving portion 100 being set at the center; and an oblique axis S extending intermediately between the X- and Y-axes. The detecting elements R11 to R34 are disposed on the respective axes at edges of the diaphragm portion 102.

In the multiaxial sensor 105, the detecting elements R11 to R34 constitute bridge circuits for measuring three-axial forces or moments on X-, Y-, and Z-axes. More specifically, the detecting elements R11 to R14 on the X-axis constitute a bridge circuit 106 as shown in FIG. 23A to obtain a voltage Vx. The detecting elements R21 to R24 on the Y-axis constitute a bridge circuit 107 as shown in FIG. 23B to obtain a voltage Vy. The detecting elements R31 to R34 on the S-axis constitute a bridge circuit 108 as shown in FIG. 23C to obtain a voltage Vz. By combining the voltages Vx, Vy, and Vz obtained by the bridge circuits 106 to 108, three-axial forces or moments on X-, Y-, and Z-axes can be calculated.

Patent Document 1: JP-A-4-194634 (FIG. 2; FIG. 3; FIG. 7; page 3, lower left column, line 3 to lower right column, line 6; and page 4, lower right column, lines 9 to 15)

DISCLOSURE OF THE INVENTION

Problem that the Invention is to Solve

In the technique disclosed in Patent Document 1, the power consumption is large because three bridge circuits 106 to 108 are used. In addition, wiring is complicated for constructing three bridge circuits 106 to 108. Particularly in the case that the detecting elements R11 to R14 are formed on a silicon semiconductor substrate, wiring is required for once leading terminal signals of piezoresistive elements as the detecting elements R11 to R14 to the outside of the semiconductor substrate. Thus, existence of three bridge circuits 106 to 108 brings about constructional complication. This also brings about an increase in cost.

An object of the present invention is to provide a multiaxial sensor unit that can realize a reduction in power consumption, simplification of wiring, and a reduction in cost, and also to provide a multiaxial sensor using the unit.

Means for Solving the Problem and Effect of the Invention

According to the first aspect of the present invention, a multiaxial sensor unit is provided for measuring one or more of multiaxial force, moment, acceleration, and angular acceleration, externally applied. The sensor comprises eight strain gauges disposed on a single plane, and one bridge circuit constructed by connecting the strain gauges.

According to this aspect, only eight strain gauges are used and they constitute only one bridge circuit. Therefore, the power consumption can be reduced to about $1/6$ in comparison with a case of driving three bridge circuits each constituted by four strain gauges divided from twelve strain gauges as in the prior art. That is, because the number of strain gauges for one bridge circuit increases twice, the combined resistance becomes twice. In addition, because the number of bridge circuits is reduced from three to one, the power becomes $1/3$. Because the power $W=V^2/R$, the power consumption becomes $1/6$ by $(1/3) \times (1/2)$.

In addition, because only one bridge circuit is used, wiring can be simplified. Thus, the bridge circuit can be easily constructed without three-dimensionally intercrossing wires. Further, because the number of strain gauges can be reduced, the cost can be reduced by reducing the number of parts and the number of steps of attachment work.

According to the second aspect of the present invention, a multiaxial sensor unit is provided for measuring one or more of multiaxial force, moment, acceleration, and angular acceleration, externally applied. The sensor comprises eight strain gauges disposed on a single plane, and two bridge circuits constructed by connecting the strain gauges.

According to this aspect, only eight strain gauges are used and they constitute two bridge circuits. Therefore, the power consumption can be reduced to about $2/3$ in comparison with a case of driving three bridge circuits each constituted by four strain gauges divided from twelve strain gauges as in the prior art.

In addition, because only two bridge circuits are used, wiring can be simplified. Thus, the bridge circuits can be easily constructed without three-dimensionally intercrossing wires. Therefore, in the case of forming the bridges by an IC process or a sputtering technique, there is no need of intercrossing wires. As a result, the process can be simplified and a reduction in cost can be intended. Further, because the number of strain gauges can be reduced, the cost can be reduced by reducing the number of parts and the number of steps of attachment work.

The multiaxial sensor unit of the present invention may comprise a strain generation body comprising a force receiving portion provided at a center, a fixed portion provided on an outer circumference, and an annular diaphragm portion connecting the force receiving portion and the fixed portion to each other. The strain gauges may be disposed at four positions on outer and inner edges of the diaphragm on a line perpendicular to a center line of the diaphragm; and at four positions on the outer and inner edges of the diaphragm on a line perpendicular to the line perpendicular to the center line of the diaphragm. According to this feature, forces and moments on orthogonal two axes and further a force and a moment on an axis perpendicular to the axes can be detected.

In the multiaxial sensor unit of the present invention, each of the strain gauges may be a piezoresistive element. According to this feature, because such a piezoresistive element is ten times or more higher in gauge factor than a foil strain gauge, the sensitivity can be ten times or more improved in comparison with a case of using the foil strain gauge. Also, in the multiaxial sensor unit of the present invention, each of the strain gauges may be a strain gauges formed by a sputtering method. Because such a strain gauges by the manufacturing method is ten times or more higher in gauge factor than a general foil strain gauge, the sensitivity can be ten times or more improved in comparison with a case of using the general foil strain gauge.

According to the third aspect of the present invention, a multiaxial sensor is provided that comprises a plurality of multiaxial sensor units described in any of the above descriptions. According to this aspect, 3-axis forces and moments or accelerations and angular accelerations can be accurately detected.

In the multiaxial sensor of the present invention, the multiaxial sensor units may be disposed around a center point of the multiaxial sensor at regular angular intervals at the same distance from the center point. According to this feature, multiaxial forces, moments, accelerations, and angular accelerations, can be calculated by relatively simple calculations from changes in the resistance values of the strain gauges of each multiaxial sensor unit.

In the multiaxial sensor of the present invention, the angular interval may be 90 degrees. According to this feature, forces, moments, accelerations, and angular accelerations, on the X- and Y-axes of Cartesian coordinates whose origin is set at the center point of the multiaxial sensor, can be easily calculated.

In the multiaxial sensor of the present invention, the multiaxial sensor units may be disposed in positive and negative directions on X- and Y-axes with an origin being set at the center point. According to this feature, forces, moments, accelerations, and angular accelerations, on the X- and Y-axes, can be very easily calculated.

In the multiaxial sensor of the present invention, the angular interval may be 120 degrees. According to this feature, because multiaxial forces, moments, accelerations, and angular accelerations, can be calculated with three multiaxial sensor units, the construction of the multiaxial sensor can be further simplified.

In the multiaxial sensor of the present invention, the strain gauges may be disposed on outer and inner edges of the diaphragm on a line extending through a center point of the multiaxial sensor and a center point of each multiaxial sensor unit; and on the outer and inner edges of the diaphragm on a line perpendicular to the former line at the center point of the multiaxial sensor unit. According to this feature, because the strain gauges can be attached to portions where the strain is the largest in the multiaxial sensor unit, the sensitivity can be improved.

In the multiaxial sensor of the present invention, the sensor may comprise a first member comprising the multiaxial sensor units each comprising the strain gauges; and a second member comprising strain generation bodies opposed to the multiaxial sensor units and comprising no strain gauges. Opposed force receiving portions of strain generation bodies may be connected to each other, and multiaxial forces and moments applied between the first and second members may be measured. According to this feature, the multiaxial forces and moments can be measured only by providing the multiaxial sensor units on only one member.

In the multiaxial sensor of the present invention, the sensor may comprise the multiaxial sensor units and an operation body provided on the force receiving portion of each multiaxial sensor unit, and multiaxial accelerations and angular accelerations applied to the multiaxial sensor units may be measured. According to this feature, the multiaxial accelerations and angular accelerations can be measured only by providing the multiaxial sensor units on only one member.

BEST FORM FOR CARRYING OUT THE INVENTION

Hereinafter, preferred embodiments of the present invention will be described with reference to drawings. FIG. 1A is a plan view of a multiaxial sensor unit 10 according to a first embodiment of the present invention when viewed from a surface to which strain gauges are attached. FIG. 1B is a central vertical sectional front view of the multiaxial sensor unit 10. In FIGS. 1A and 1B, the multiaxial sensor unit 10 is for measuring one or more of multiaxial force, moment, acceleration, and angular acceleration, externally applied. The multiaxial sensor unit 10 includes eight strain gauges R11 to R24 disposed on a single plane, and a bridge circuit 11 made by connecting the strain gauges R11 to R24.

The strain gauges R11 to R24 are attached to a strain generation body 12 made of a metallic flexible material such as aluminum or SUS. The strain generation body 12 is made up of a force receiving portion 13 provided at the center; a fixed portion 14 provided on the outer circumference; and an annular diaphragm portion 15 connecting the force receiving portion 13 and the fixed portion 14 to each other. The fixed portion 14 is for attaching the multiaxial sensor unit 10 to another device. The fixed portion 14 is formed into a large thickness high in rigidity so that the portion 14 is hard to be strained or deformed even when an external force is applied to the force receiving portion 13. The diaphragm portion 15 is formed into a small thickness so as to be easy to be deformed. The force receiving portion 13 is columnar and efficiently conducts an externally received force to the diaphragm portion 15. Thus, when an external force is applied to the force receiving portion 13, the resultant strain and deformation almost concentrate on the diaphragm portion 15.

As each of the strain gauges R11 to R24, a metallic foil strain gauge or a metallic wire strain gauge is used. Each of the strain gauges R11 to R24 is a kind of a resistor, and a detecting element to be used by being attached to where a strain is generated. Generation of a strain causes a change in the resistance value, and thereby the strain epsilon can be measured. In general, such a gauge has a proportional characteristic in which the resistance value increases to a strain epsilon by tension and the resistance value decreases to a strain epsilon by compression. Normally, such a gauge is used within the elastic region of the material in which the stress sigma is in proportion to the strain epsilon.

The strain gauges R11 to R24 are disposed at four positions on the outer and inner edges of the diaphragm portion 15 on a line, i.e., the X-axis, perpendicular to the center line, i.e., the Z-axis, of the diaphragm portion 15; and at four positions on the outer and inner edges of the diaphragm portion 15 on a line, i.e., the Y-axis, perpendicular to the X-axis. The strain gauges R11 to R24 are attached at the respective positions. Because any of the strain gauges R11 to R24 is provided on the edge of the diaphragm portion 15, it can efficiently receive a strain generated on the strain generation body.

FIG. 2 shows a state wherein an X-axial force Fx is applied to the force receiving portion 13 of the multiaxial sensor unit 10, and changes in the respective strain gauges R11 to R14. The force Fx acts as a moment My, i.e., a moment around the Y-axis, corresponding to the distance L between the application point 13*a* of the force receiving portion 13 and the origin O of the multiaxial sensor unit 10. At this time, all the strain gauges R11 to R14 on the X-axis are displaced as shown in FIG. 2, and a strain is detected. In FIG. 2, (+) of the strain gauges R11 to R24 indicates an increase in resistance value by receiving a tensile strain, and (−) indicates a decrease in resistance value by receiving a compressive strain.

Next, when a Y-axial force Fy is applied to the force receiving portion 13 of the multiaxial sensor unit 10, the force Fy acts as a moment Mx, i.e., a moment around the X-axis, corresponding to the distance L between the application point 13a of the force receiving portion 13 and the origin O of the multiaxial sensor unit 10. This can be thought by shifting by 90 degrees the above-described state when the X-axial force Fx is applied, and thus the description thereof is omitted here.

FIG. 3 shows a state and changes in the respective strain gauges R11 to R24 when a Z-axial force Fz is applied to the force receiving portion 13 of the multiaxial sensor unit 10.

Table 1 shows changes in the strain gauges R11 to R24 to the above-described forces and moments. In Table 1, "+" indicates an increase in resistance value, "−" indicates a decrease in resistance value, and "0" indicates substantially no change in resistance value. The force or moment in the reverse direction is inverted in sign.

TABLE 1

| Strain gauge | X-axis | | | | Y-axis | | | |
|---|---|---|---|---|---|---|---|---|
| | R11 | R12 | R13 | R14 | R21 | R22 | R23 | R24 |
| Fx(My) | − | + | − | + | 0 | 0 | 0 | 0 |
| Fy(Mx) | 0 | 0 | 0 | 0 | − | + | − | + |
| Fz | − | + | + | − | − | + | + | − |

FIG. 4 shows a bridge circuit 11 made by connecting the strain gauges R11 to R24. In the bridge circuit 11, gauges are connected in series from a driving voltage V+ to GND in the order of R11, R12, R23, and R24, and in the order of R14, R13, R22, and R21. The gauges R12 and R14 may be replaced by each other. The voltage at the node a between R11 and R12 is represented by Va; the voltage at the node b between R13 and R14 is represented by Vb; the voltage at the node c between R23 and R24 is represented by Vc; and the voltage at the node d between R21 and R22 is represented by Vd. The node g between R12 and R23 and the node h between R13 and R22 may be short-circuited.

FIG. 1A shows a wiring diagram for connecting the strain gauges R11 to R24, by a chain double-dashed line in FIG. 1A. By wiring thus, there is no overlapping portion and therefore there is no need of crossing wires. This wiring structure can be manufactured by one sputtering process. Consequently, the manufacturing process is simplified and a reduction in cost can be intended.

FIG. 5 shows relations between the node voltages Va to Vd and forces or moments. The force Fx and moment My can be measured as the difference Vx between the node voltages Va and Vb, i.e., Vx=Va−Vb. The force Fy and moment Mx can be measured as the difference Vy between the node voltages Vc and Vd, i.e., Vy=Vc−Vd. The force Fz can be measured as the sum Vz of the difference (Va−Vc) between the node voltages Va and Vc and the difference (Vb−Vd) between the node voltages Vb and Vd, i.e., Vz=(Va−Vc)+(Vb−Vd). Alternatively, as shown by brackets in FIG. 5, the force Fz may be measured as the sum Vz of the difference (Va−Vd) between the node voltages Va and Vd and the difference (Vb−Vc) between the node voltages Vb and Vc, i.e., Vz=(Va−Vd)+(Vb−Vc). The above calculations may be electrically directly carried out by using an OP amplifier 19, or may be carried out by using a computer after the node voltages are A/D-converted.

Here will be briefly described a principle for obtaining forces or moments from the node voltages Va to Vd. When a force Fx or moment My is applied, only R11 to R14 change and R21 to R24 do not change. Thus, the bridge circuit 11 shown in FIG. 6A can be considered to be the same as that shown in FIG. 6B. This is a bridge circuit 11 conventionally used, and resultingly, Vx=Va−Vb.

When a force Fz is applied, different strain gauges R11 to R24 operate in accordance with the direction of the force Fz, as shown in FIG. 7A. FIG. 7B shows changes when the force is applied in the direction indicated by an arrow T1 in FIG. 7A; FIG. 7C shows changes when the force is applied in the direction indicated by an arrow T2; FIG. 7D shows changes when the force is applied in the direction indicated by an arrow T3; and FIG. 7E shows changes when the force is applied in the direction indicated by an arrow T4.

In this embodiment, for example, if Vz=Va−Vc or Vz=Vb−Vd, there is no reaction as Fz when the resultant force of Fx and Fy acts in the direction of the arrow T1. On the other hand, if Vz=Va−Vd or Vz=Vb−Vc, there is a reaction as Fz. Table 2 shows those relations.

TABLE 2

| Moment | Va − Vc | Va − Vd | Vb − Vc | Vb − Vd |
|---|---|---|---|---|
| T1 direction | 0 | + | − | 0 |
| T2 direction | − | 0 | 0 | + |
| T3 direction | − | 0 | 0 | + |
| T4 direction | 0 | + | − | 0 |

Therefore, by adopting Vz=(Va−Vc)+(Vb−Vd), even if forces in the directions of the arrows T1 to T4 act, Fz can be accurately output because the forces cancel out. Also, Vz=(Va−Vd)+(Vb−Vc) can be adopted. Changes in the node voltages Va to Vd in each mode accord with divided voltages of the Ohm's law when (R+delta R) is set in the case of (+) in which the resistance of a strain gauge increases, and (R−delta R) is set in the case of (−) in which the resistance of the strain gauge decreases.

In this embodiment, a force Fx or moment My, a force Fy or moment Mx, and a force Fz are obtained. However, the present invention is not limited to that. Acceleration or angular acceleration on each axis may be obtained. In such a case, by attaching a weight to the front end of the force receiving portion 13, the motion of the force receiving portion 13 can be increased to improve the sensitivity.

The bridge circuit 11 is not limited to that shown in FIG. 4. For example, as shown in FIG. 8, gauges may be connected in series from the driving voltage V+ to GND in the order of R13, R14, R21, and R22, and in the order of R12, R11, R24, and R23. The node g between R14 and R21 and the node h between R11 and R24 may be short-circuited. Otherwise, as shown in FIG. 9, gauges may be connected in series from the driving voltage V+ to GND in the order of R11, R12, R23, and R24, and in the order of R14, R13, R22, and R21, and further the node g between R12 and R23 and the node h between R13 and R22 may be short-circuited. In this case, the short circuit of the nodes g and h may be released.

Further, as shown in FIG. 10, a bridge circuit 11 may include in parallel a bridge circuit 11a constituted by R11 to R14 and a bridge circuit 11b constituted by R21 to R24. In this case, Fx or My is calculated in the bridge circuit 11a of R11 to R14 by Vx=Va−Vb; and Fy or Mx is calculated in the bridge circuit 11b of R21 to R24 by Vy=Vc−Vd. Fz is calculated by Vz=(Va−Vc)+(Vb−Vd), or Vz=(Va−Vd)+(Vb−Vc), or Vz=Va+Vb, or Vz=Vc+Vd. In the multiaxial sensor unit 10 using two bridge circuits 11 as in this example, the sensitivity becomes nearly double in comparison with the multiaxial sensor unit 10 using a single bridge circuit 11 as shown in FIG. 4.

Otherwise, as shown in FIG. 11, a bridge circuit 11 may include in parallel a bridge circuit 11a constituted by R11 to R14 and a bridge circuit 11b constituted by R21 to R24. In this example, the strain gauges R11 to R24 are changed in place in the bridge circuit 11b constituted by R21 to R24, shown in FIG. 10. In this case, Fx or My is calculated in the bridge circuit 11a of R11 to R14 by Vx=Va−Vb; and Fy or Mx is calculated in the bridge circuit 11b of R21 to R24 by Vy=Vc−Vd. Fz is calculated by Vz=Va+Vb+Vc+Vd, or Vz=Va+Vb, or Vz=Vc+Vd.

On the other hand, the present invention is not limited to the above-described fixed bridge circuits 11, a detecting circuit 16 as shown in FIG. 12 may be used. The detecting circuit 16 includes strain gauges R11 to R24 connected circularly; a switch 17 for switching between a driving voltage V+ and GND to be set to the strain gauges R11 to R24; and a microcomputer 18 for controlling the switch 17 and calculating node voltages to obtain forces or moments. Connection of the strain gauges R11 to R24 and setting of node voltages are like the bridge circuit 11 shown in FIG. 4. In this example, the node e between R11 and R14 and the node f between R21 and R24 are set.

In the case of obtaining a moment Mx or My, a signal PO of an output port of the microcomputer 18 is turned off and output terminals of the switch 17 are connected to terminals 1, 3, and 5 in FIG. 12. Thereby, the nodes e and f of the bridge circuit 11 are connected to the driving voltage V and the nodes g and h are connected to GND. That is, a bridge circuit 11 is formed that is made up of a bridge circuit 11a constituted by strain gauges R11 to R14 and a bridge circuit 11b constituted by strain gauges R21 to R24. FIG. 13 shows the bridge circuit 11 at this time. The moment Mx or force Fy can be detected as the difference Vy between the node voltages Vc and Vd. The moment My or force Fx can be detected as the difference Vx between the node voltages Va and Vb.

In the case of obtaining a force Fz, the signal PO of the microcomputer 18 is turned on and the output terminals of the switch 17 are connected to terminals 2, 4, and 6 in FIG. 12. Thereby, the node b of the bridge circuit 11 is connected to the driving voltage V and the node c is connected to GND. The nodes g and h are separated from GND and the nodes e and f are separated from the driving voltage V+. The detecting circuit 16 forms a single bridge circuit 11 constituted by eight strain gauges R11 to R24. FIG. 14 shows the bridge circuit 11 at this time. The force Fz can be detected as the difference Vz between the node voltages Va and Vd.

The voltages Vx, Vy, and Vz are calculated in an OP amplifier 19 and then input to A/D conversion ports of the microcomputer 18. In accordance with the state of the output port PO, that is, on or off, the microcomputer 18 judges whether the present case is for detecting a moment Mx or My, or for detecting a force Fz. Thereby, the microcomputer 18 ignores unnecessary data, for example, data of the force Fz when the moment Mx or My is detected.

By repeating the above operation, the moments Mx and My and the force Fz can be accurately detected in time division.

Next, a second embodiment of the present invention will be described with reference to FIG. 15. As shown in FIG. 15, in the second embodiment, a piezoresistive element is used as each of strain gauges R101 to R204. By using a semiconductor manufacturing process, piezoresistive elements necessary for one multiaxial sensor unit 10 are integrated on one silicon semiconductor substrate 20, and fixed to a strain generation body 12 by die bonding, i.e., soldering. Such a piezoresistive element is ten times or more higher in gauge factor than a foil strain gauge. Thus, the sensitivity can be ten times or more improved in comparison with a case of using a foil strain gauge. In addition, by using a semiconductor process for IC, not only the piezoresistive elements as detecting elements but also circuit elements such as an OP amplifier for signal processing can be formed and integrated on the same semiconductor substrate 20.

Next, a third embodiment of the present invention will be described with reference to FIG. 16. As shown in FIG. 16, in the third embodiment, a chromium oxide film 21 formed by sputtering is used for strain gauges and a bridge circuit. That is, an insulating film 22 is formed on a strain generation body 12 by sputtering; the chromium oxide film 21 is formed on the insulating film 22 by sputtering; and then a protective film 23 is formed on the chromium oxide film 21. The insulating film 22 is for preventing the strain generation body 12 from being in electrical contact with the chromium oxide film 21. The chromium oxide film 21 is formed by sputtering, and thereby strain gauges and a conductive bridge circuit can be formed at once. In each portion to function as a strain gauge, the width of a line decreases in the direction for strain detection to increase in resistance. The protective film 23 is provided for preventing oxidation and preventing damage due to physical contact.

Further, a fourth embodiment of the present invention will be described with reference to FIGS. 17 to 18. FIG. 17A is a plan view showing arrangement of strain gauges R11 to R48 when a multiaxial sensor 1 according to the fourth embodiment of the present invention is Z-axially transparently viewed from the position of a second member 3. FIG. 17B is a central vertical sectional front view of the multiaxial sensor 1. In FIGS. 17A and 17B, the multiaxial sensor 1 includes a plurality of multiaxial sensor units 4 to 7 for measuring one of multiaxial force, moment, acceleration, and angular acceleration, externally applied to a first member 2 and a second member 3. Each of the first and second members 2 and 3 is formed into a disk-shaped flange. Strain gauges R11 to R48 are attached only to the front surface 2a of the first member 2.

The first member 2 includes four multiaxial sensor units 4, 5, 6, and 7. Any of the multiaxial sensor units 4, 5, 6, and 7 has the same construction as the multiaxial sensor unit 10 of the first embodiment, and the same bridge circuit 11 or detecting circuit 16 as described above is provided. The second member 3 includes four strain generation bodies 12 opposed to the multiaxial sensor units 4 to 7. Force receiving portions 13 of each of the multiaxial sensor units 4 to 7 and each of the strain generation bodies 12, facing each other, are connected with a bolt 9. Thereby, the first and second members 2 and 3 are united.

The multiaxial sensor units 4 to 7 are arranged around the center point O of the multiaxial sensor 1 at regular angular intervals at the same distance from the center point O. In this embodiment, they are arranged at regular angular intervals of 90 degrees. Further, the multiaxial sensor units 4 to 7 are arranged in the positive and negative directions on the X- and Y-axes around the origin set at the center point O. Thus, the multiaxial sensor 1 functions as a 6-axis force sensor for measuring forces on orthogonal three axes in the three-dimensional space, and moments around the respective axes. The vertical axis extending from the origin O toward the first member 2 is set as the Z-axis. FIG. 18 shows the directions of the X-, Y-, and Z-axes and the directions of moments Mx, My, and Mz around the respective axes.

The multiaxial sensor units 4 to 7 are the same in size and thickness. Thus, they are equal in rigidity. Therefore, when the first and second members 2 and 3 and their force receiving portions 13 are displaced such that they form four sides of a parallelogram as a whole, strains corresponding to the directions and magnitudes of forces on the respective multiaxial sensor units 4 to 7 are generated on the strain gauges R11 to R48. Thus, forces and moments can be accurately detected. A step may be formed at the attachment position of each strain gauge in order to simplifying the attachment work for the strain gauge and intend to protect the strain gauge. In addition, tap holes for attachment to another member may be formed in the portion other than the diaphragm portion 15.

FIG. 19 shows bridge circuits 11 constructed by connecting the strain gauges R11 to R24. As each of the bridge circuits 11, any of the bridge circuits described in the first embodiment is applicable. In this embodiment, however, only one of them will be described by way of example. As shown in FIG. 19, in the multiaxial sensor unit 4, a bridge circuit 11 is provided that has in parallel a bridge circuit constituted by R11 to R14 and a bridge circuit constituted by R15 to R18. In the multiaxial sensor units 5 to 7, bridge circuits 11 are provided that have in parallel bridge circuits constituted by R21 to R24; R31 to R34; and R41 to R44, and bridge circuits constituted by R25 to R28; R35 to R38; and R45 to R48, respectively.

In this example, signals indicating forces on the X-, Y-, and Z-axes, detected by the bridge circuit 11 constituted by the strain gauges R11 to 18, are represented by Vx1, Vy1, and Vz1, respectively. In addition, the voltage at the node a1 between R11 and R12 is represented by Va1; the voltage at the node b1 between R13 and R14 is represented by Vb1; the voltage at the node c1 between R17 and R18 is represented by Vc1; and the voltage at the node d1 between R15 and R16 is represented by Vd1. Thus, measurement can be made by the following calculations.

$Vx1 = Va1 - Vb1$ $Vy1 = Vc1 - Vd1$ $Vz1 = Va1 + Vb1 - Vc1 - Vd1$

Signals Vx2, Vy2, Vz2, Vx3, Vy3, Vz3, Vx4, Vy4, and Vz4 indicating forces on the X-, Y-, and Z-axes, detected by the bridge circuits 11 constituted by the strain gauges R21 to 28, strain gauges R31 to 38, and strain gauges R41 to 48, can be measured in similar manners. But, Vy1 and Vy3, and Vx2 and Vx4, are inversed in polarity of the signal indicating the direction of the force; and Vz1, Vz2, Vz3, and Vz4 are the same in polarity of the signal indicating the direction of the force.

In this embodiment, therefore, using results obtained by the multiaxial sensor units 4 to 7, 6-axis force and moment components can be obtained by the following calculations. But, the signal outputs of the multiaxial sensor units 4 to 7 for three axes may include a signal or signals not to be used. In this embodiment, the following calculations may be carried out by an OP amplifier after resistance values are converted into voltages by known or new means; or carried out by a micro controller or computer by using A/D converters.

$Fx = Vx4 - Vx2$ $Fy = Vy3 - Vy1$ $Fz = Vz1 + Vz2 + Vz3 + Vz4$ $Mx = Vz4 - Vz2$ $My = Vz3 - Vz1$ $Mz = Vy1 + Vx2 + Vy3 + Vx4$

A calculation method using a bridge circuit 11 of a multiaxial sensor 1 that functions as a 6-axis force sensor for measuring forces on orthogonal three axes in the three-dimensional space, and moments around the respective axes, is described in detail in the Japanese Patent Application No. 2003-172045 by the same applicant as the present application, which was withdrawn after Japanese Patent Application Publication No. 2005-031062 was filed claiming priority thereto.

Further, a fifth embodiment of the present invention will be described with reference to FIG. 20. FIG. 20 is a plan view showing arrangement of strain gauges R11 to R38 when a multiaxial sensor 1 according to the fifth embodiment is Z-axially transparently viewed from the position of a second member 3. In the fifth embodiment, a first member 1 includes three multiaxial sensor units 4 to 6. A second member 3 includes three strain generation bodies 12 opposed to the respective multiaxial sensor units 4 to 6. The multiaxial sensor units 4 to 6 are arranged around the center point O of the multiaxial sensor 1 at regular angular intervals of 120 degrees at the same distance from the center point O.

Any of the multiaxial sensor units 4, 5, and 6 of this embodiment has the same construction as the multiaxial sensor unit 10 of the first embodiment, and the same bridge circuit 11 or detecting circuit 16 as described above is provided. Also in this case, using results obtained by the multiaxial sensor units 4 to 6, 6-axis force and moment components can be detected. Thus, the multiaxial sensor 1 of this embodiment functions as a 6-axis force sensor for measuring forces on orthogonal three axes in the three-dimensional space, and moments around the respective axes. The calculation method using bridge circuits 11 of the multiaxial sensor 1 is the same as in the fourth embodiment, and therefore the detailed description is omitted.

Next, a sixth embodiment of the present invention will be described. Although the first and second members 2 and 3 are connected to each other in the above-described fourth and fifth embodiments, only the first member 2 can be used solely. In this case, by attaching a weight as an operation body to the force receiving portion 13 of each multiaxial sensor unit 10, multiaxial accelerations and angular accelerations applied to the multiaxial sensor unit 10 can be measured.

Although the preferred embodiments of the present invention have been described as above, the present invention is not limited to the above-described embodiments. Various changes in design can be made within the scope of the description of claims. For example, in the above-described bridge circuit 11, a driving method is used in which a constant voltage and GND are applied. However, the present invention is not limited to that. Positive and negative voltages may be applied. Otherwise, in place of a constant voltage, a constant current may be applied for driving.

It is a matter of course that the arrangement of the strain gauges in each of the above-described embodiments is not limited to that shown in the corresponding drawing. It suffices if Mx, My, Fz, etc., can be obtained by calculations such as subtraction and addition of node voltages of the bridge circuit 11 even when the arrangement of the strain gauges is changed.

In the above-described embodiments, the sensor is used for detecting forces and moments on three or six axes. However, the present invention is not limited to that. For example, the sensor may be used as a 2-axis sensor for detecting only 2-axial forces and moments on the X- and Y-axes. Otherwise, the sensor may be used as a 1-axis sensor for detecting only 1-axial force and moment on one of the X-, Y-, and Z-axes.

INDUSTRIAL APPLICABILITY

The present invention is the most suitable for a multiaxial sensor unit and a multiaxial sensor, capable of measuring the direction and magnitude of at least one of six components of forces on orthogonal three axes and moments around the respective axes, externally applied. Therefore, for example, in a humanoid robot expected to be put to practical use in the amusement field, if a multiaxial sensor unit and a multiaxial sensor of the present invention are incorporated in a hand or leg of the humanoid robot, forces and moments applied to the hand or leg of the humanoid robot can be detected with high responsibility and high accuracy at a lower cost than a conventional sensor.

BRIEF DESCRIPTION OF DRAWINGS

[FIG. 23A]
A circuit diagram showing a bridge circuit constituted by strain gauges of the prior art multiaxial sensor unit.
[FIG. 23B]
A circuit diagram showing a bridge circuit constituted by strain gauges of the prior art multiaxial sensor unit.

DESCRIPTION OF REFERENCE NUMERALS

Figure 1A:
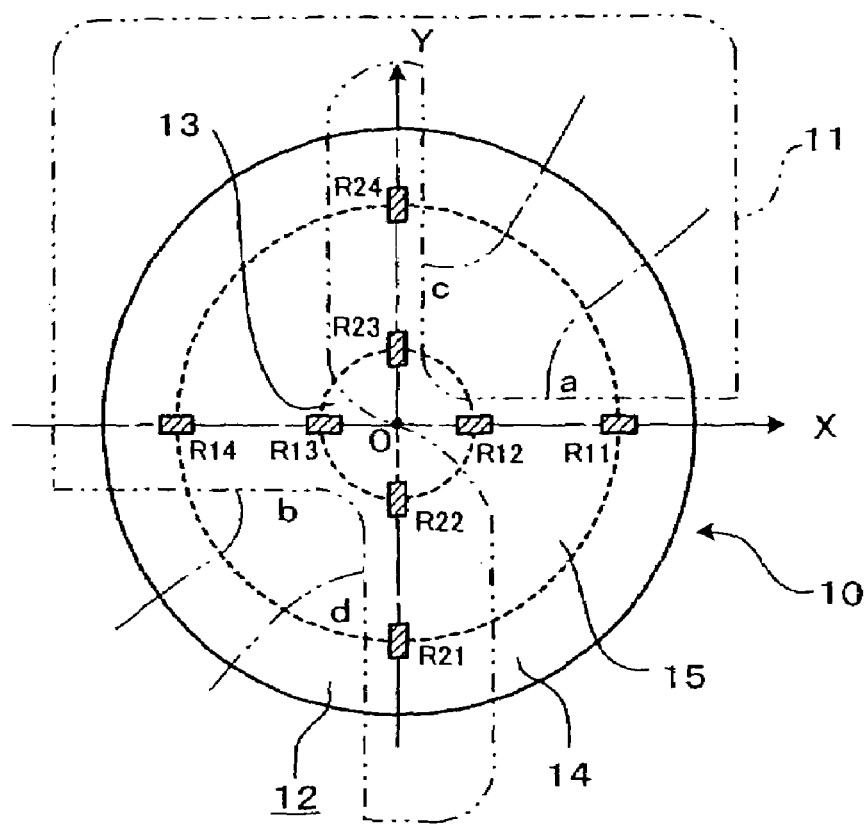
[FIG. 1A]
A plan view of a multiaxial sensor unit according to a first embodiment of the present invention to show the arrangement of strain gauges.
Figure 1B:
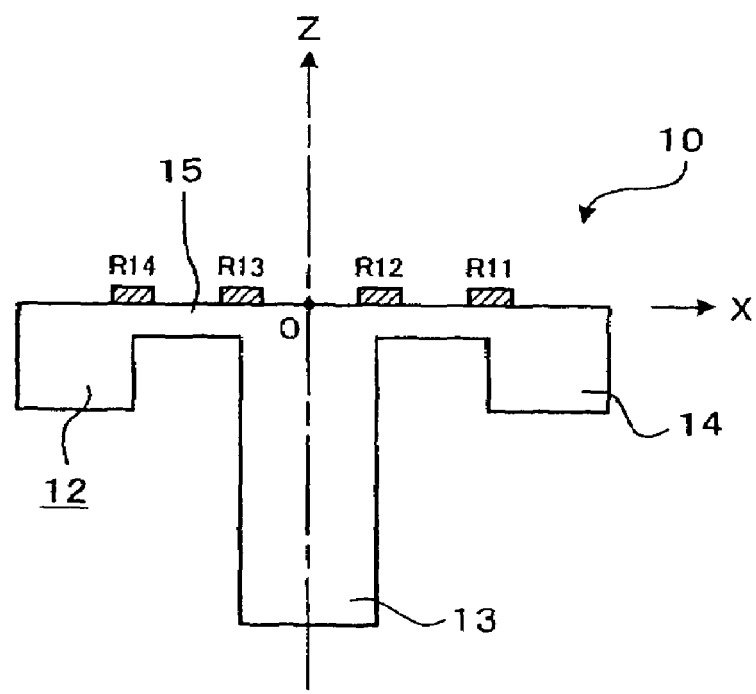
[FIG. 1B]
A central vertical sectional front view of the multiaxial sensor unit according to the first embodiment of the present invention.
Figure 2:
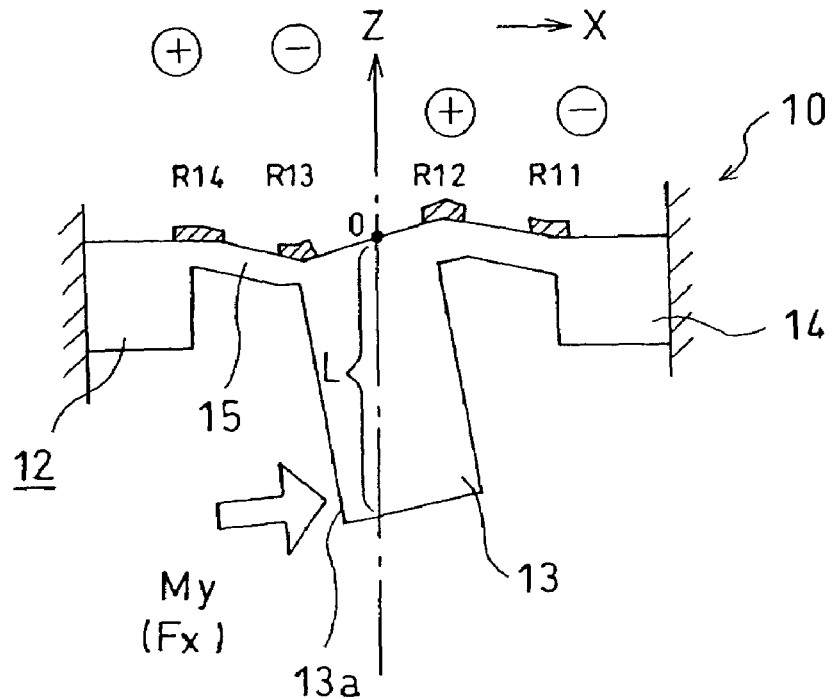
[FIG. 2]
A central vertical sectional front view showing displacement and changes in the resistance values of strain gauges when a force Fx is applied to the multiaxial sensor.
Figure 3:
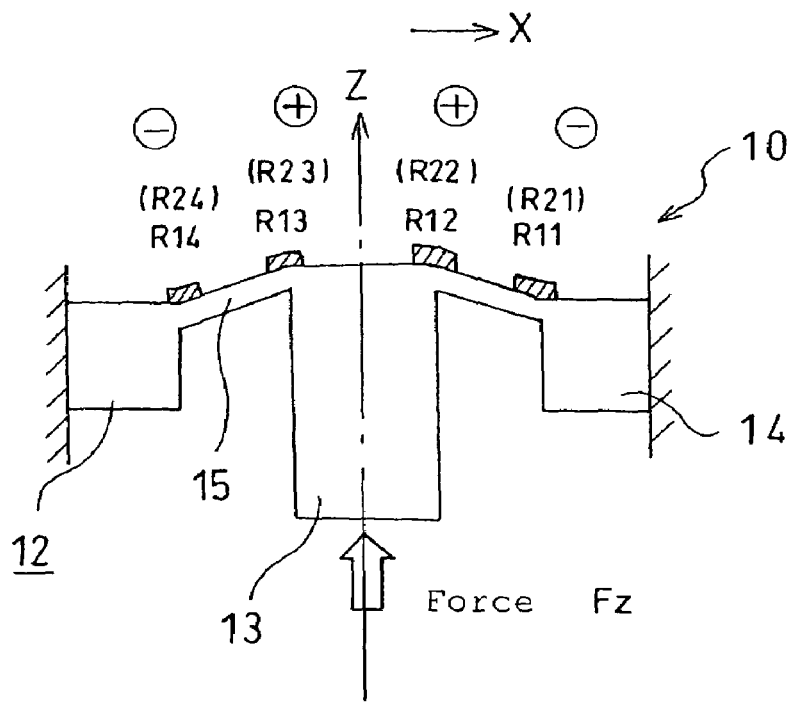
[FIG. 3]
A central vertical sectional front view showing displacement and changes in the resistance values of the strain gauges when a force Fz is applied to the multiaxial sensor.
Figure 4:
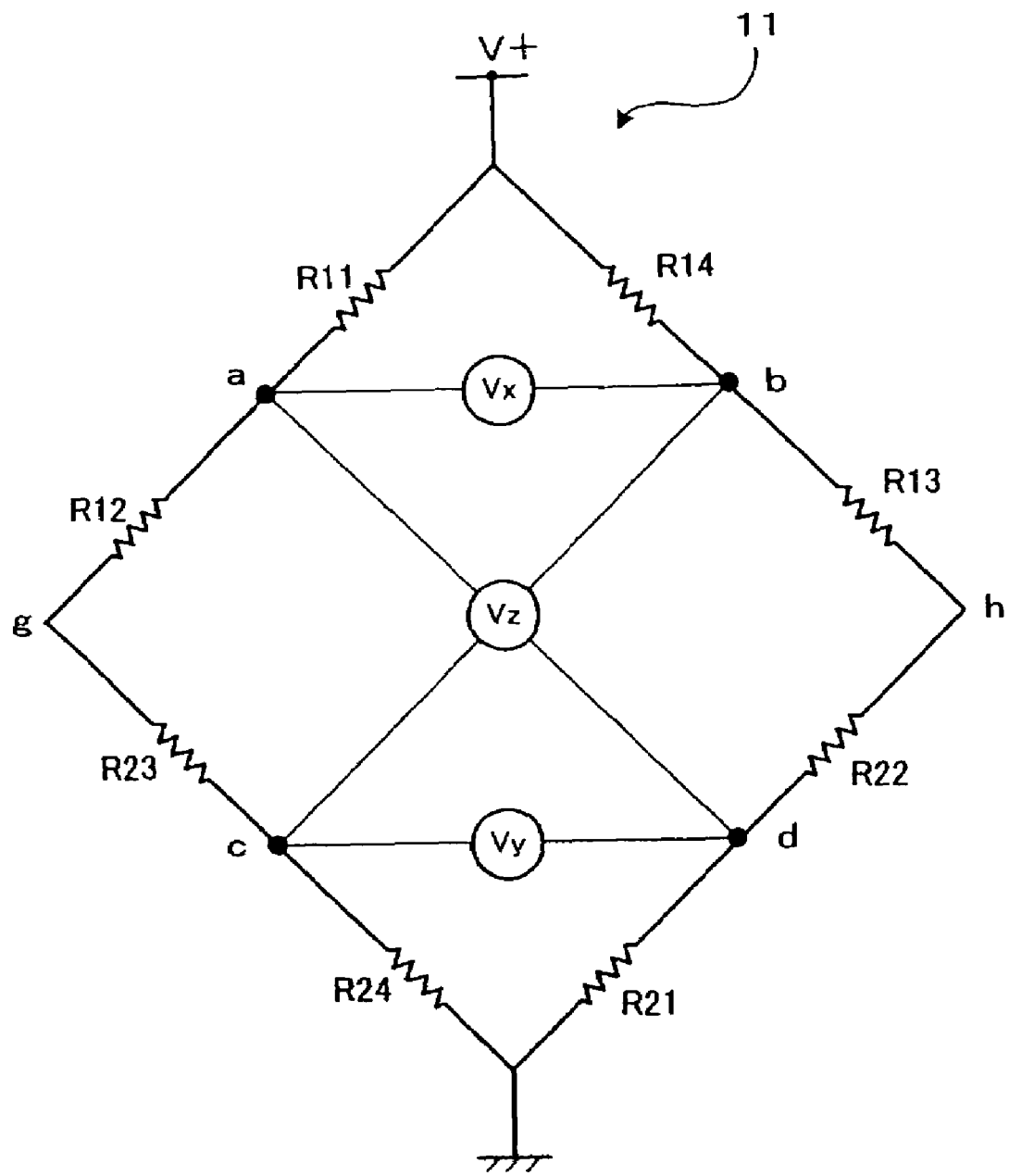
[FIG. 4]
A circuit diagram showing an example of a bridge circuit.
Figure 5:
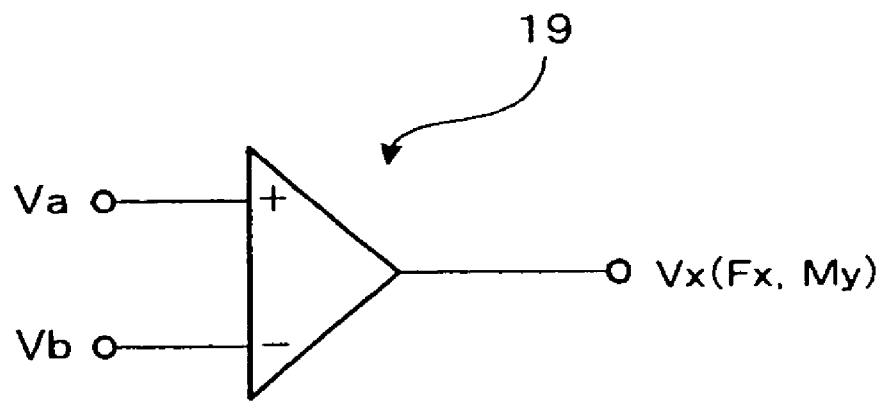
[FIG. 5]
Diagrams showing an example of calculation processing for node voltages using an OP amplifier.
Figure 5:
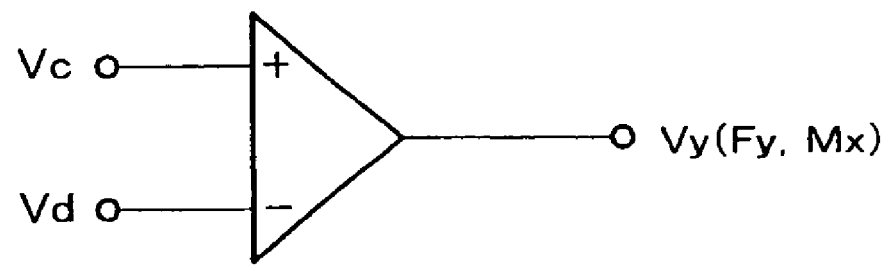
Figure 5:
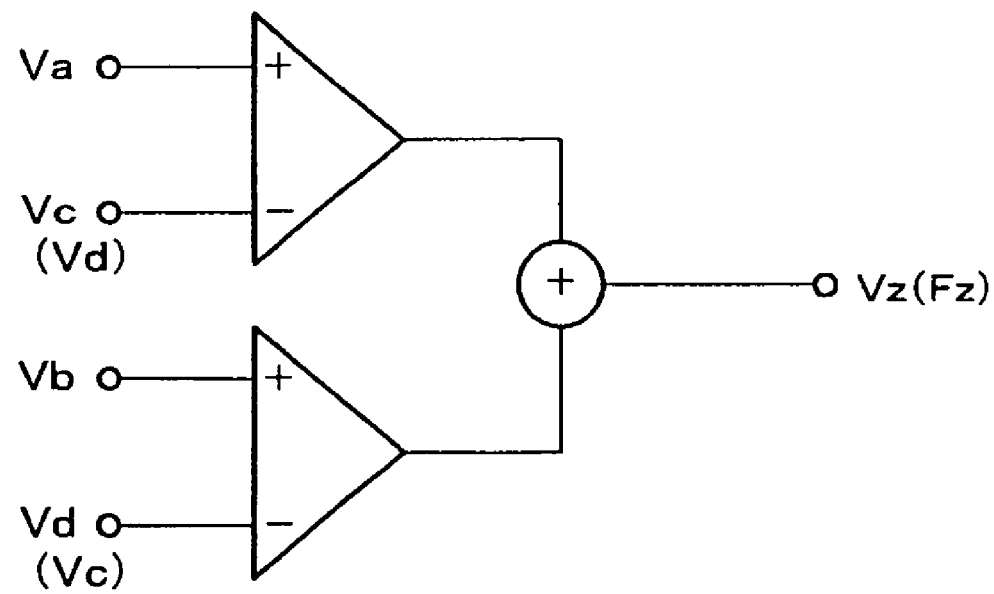
Figure 6A:
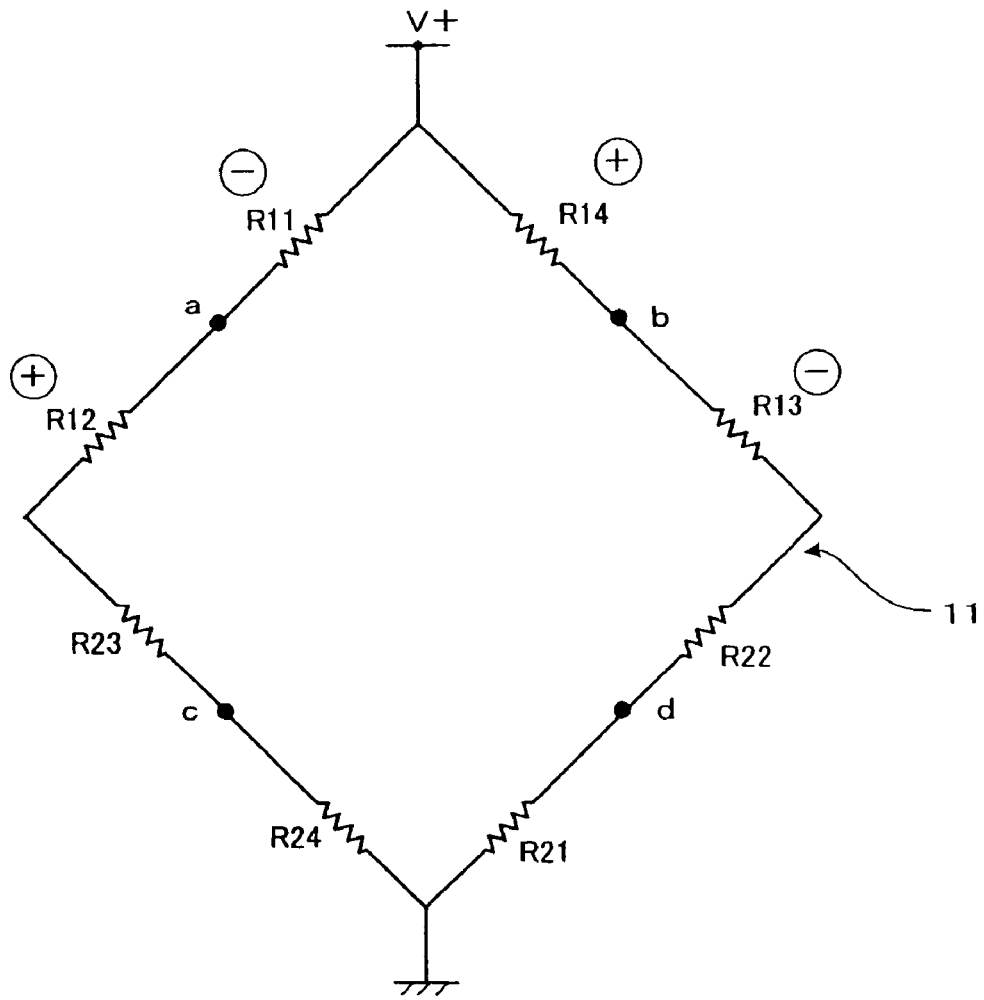
[FIG. 6A]
A circuit diagram showing an example of a bridge circuit for calculating Fx, which shows the whole construction.
Figure 6B:
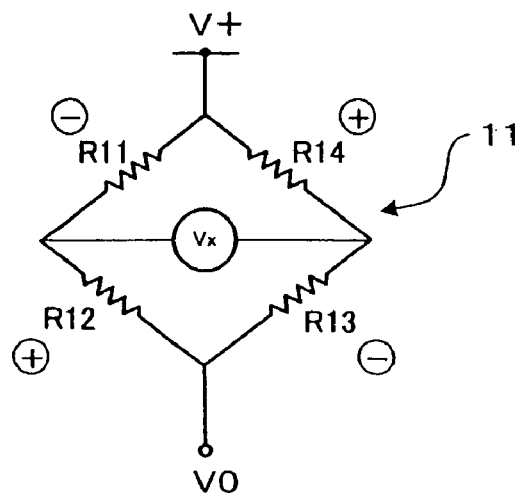
[FIG. 6B]
A circuit diagram showing an example of a bridge circuit for calculating Fx, which shows a substantially equivalent circuit.
Figure 7A:
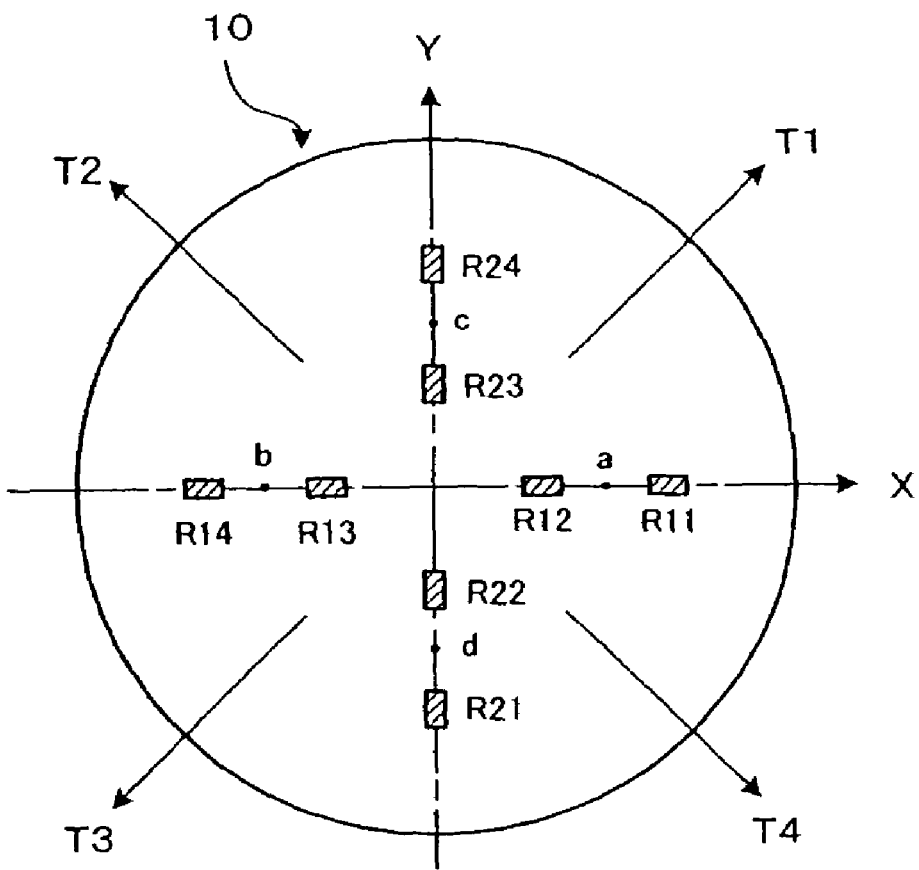
[FIG. 7A]
A reference representation for calculating Fz, which shows directions in which the force is applied.
Figure 7B:
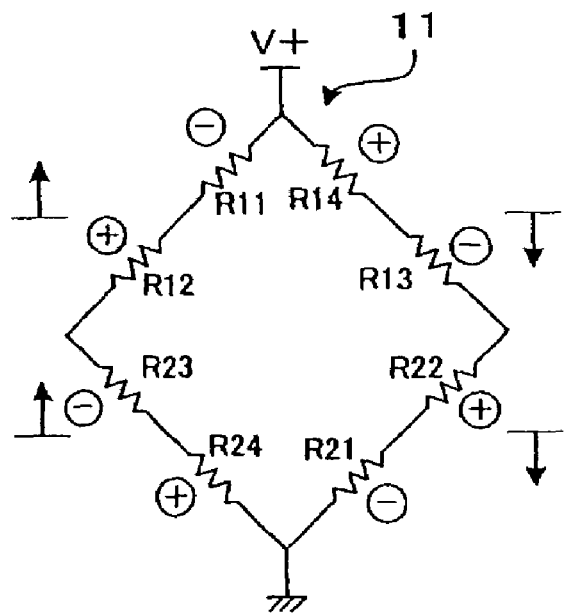
[FIG. 7B]
A reference representation for calculating Fz, which shows a bridge circuit when the force is applied in the direction indicated by an arrow T1.
Figure 7C:
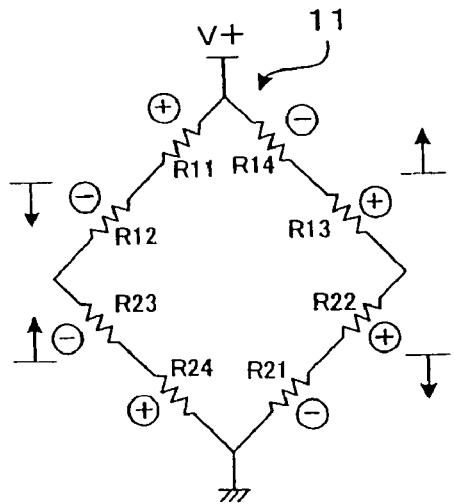
[FIG. 7C]
A reference representation for calculating Fz, which shows the bridge circuit when the force is applied in the direction indicated by an arrow T2.
Figure 7D:
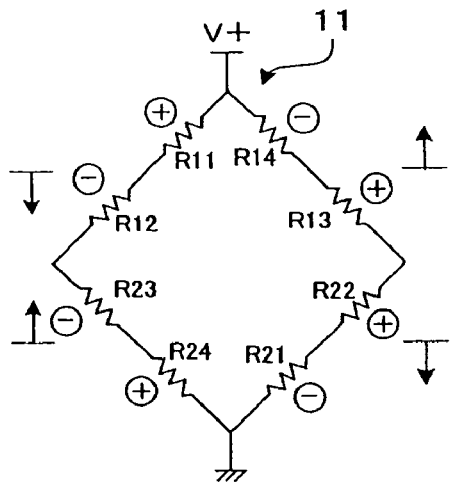
[FIG. 7D]
A reference representation for calculating Fz, which shows the bridge circuit when the force is applied in the direction indicated by an arrow T3.
Figure 7E:
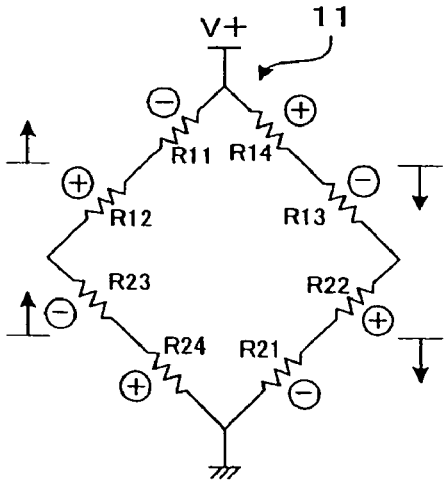
[FIG. 7E]
A reference representation for calculating Fz, which shows the bridge circuit when the force is applied in the direction indicated by an arrow T4.
Figure 8:
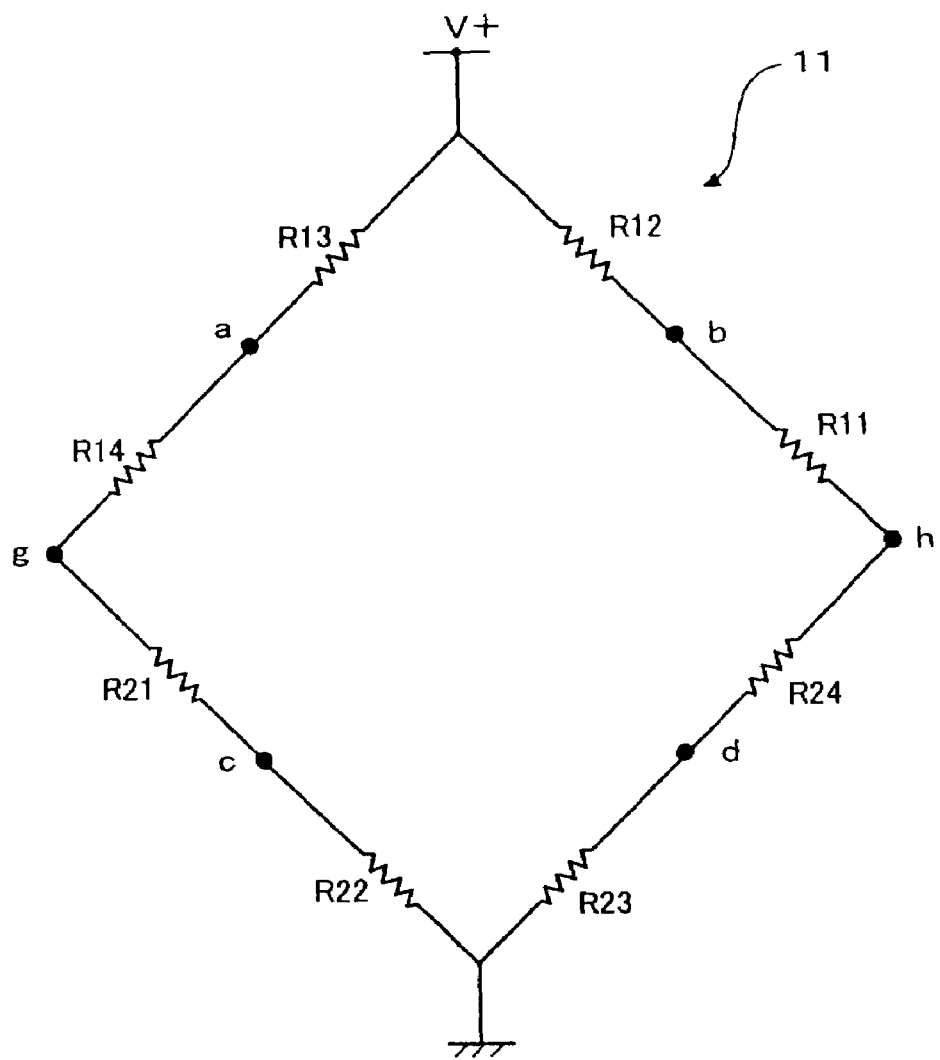
[FIG. 8]
A circuit diagram showing another example of a bridge circuit.
Figure 9:
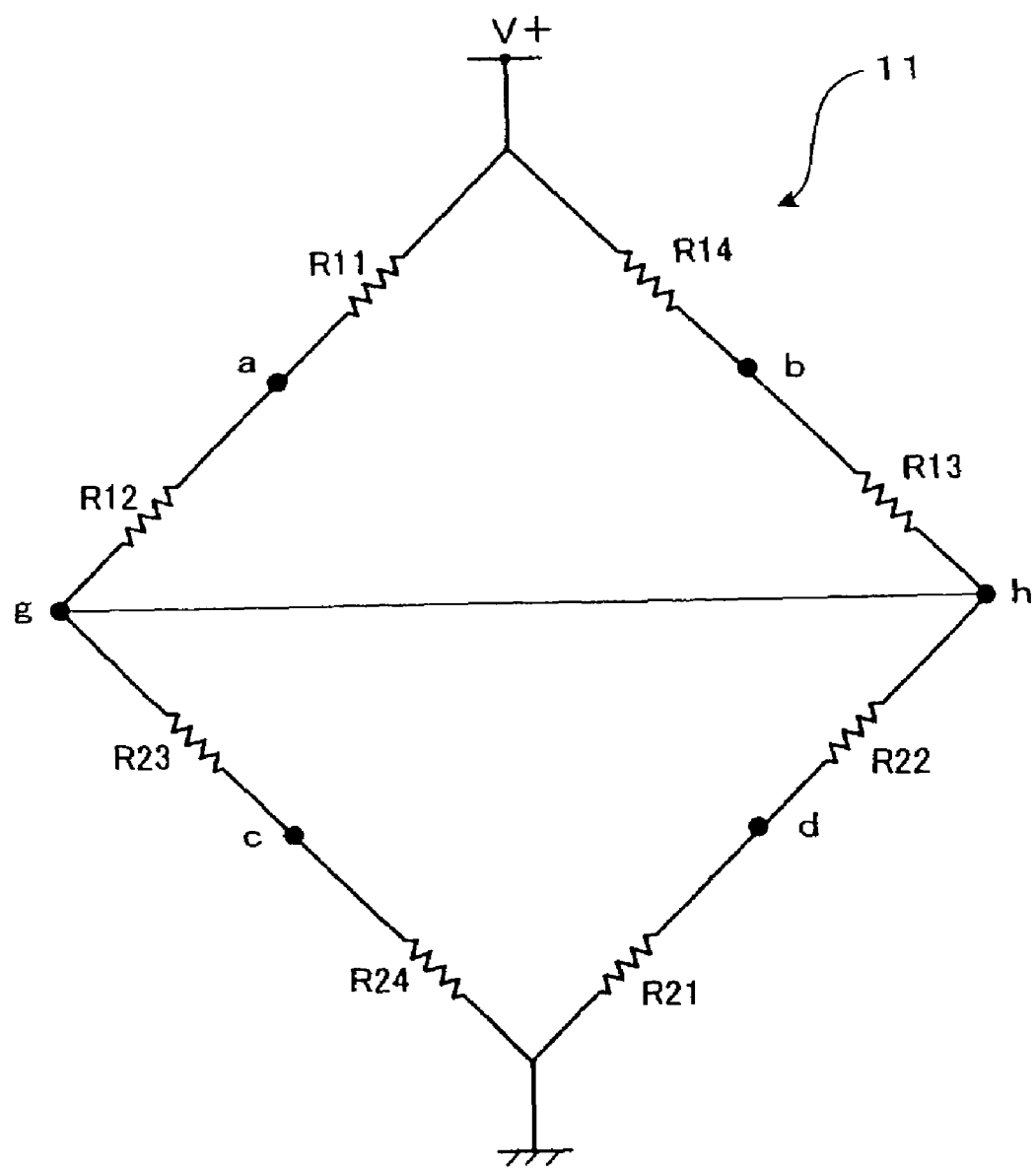
[FIG. 9]
A circuit diagram showing still another example of a bridge circuit.
Figure 10:
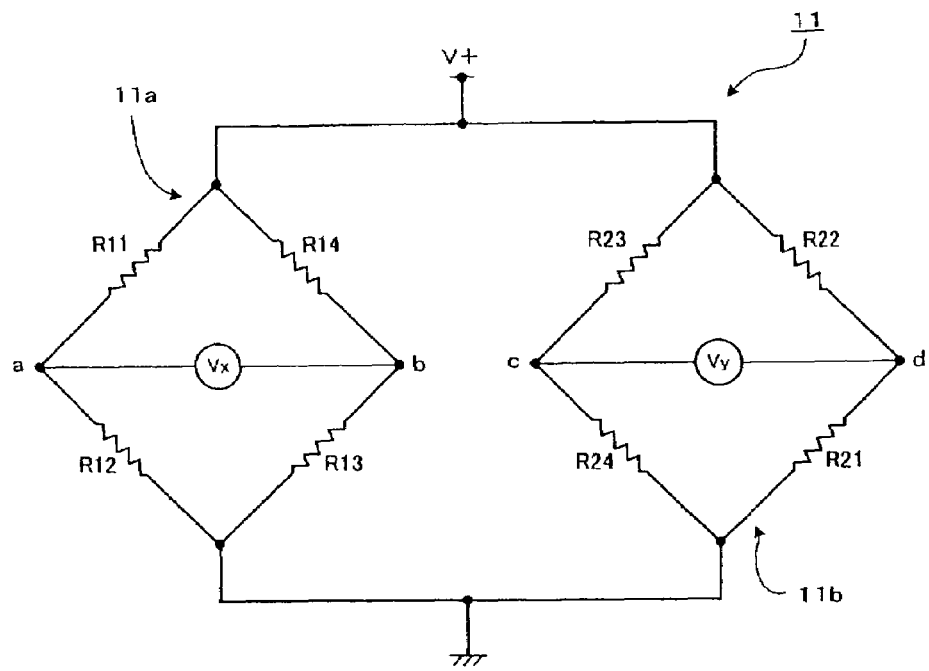
[FIG. 10]
A circuit diagram showing another example of a bridge circuit.
Figure 11:
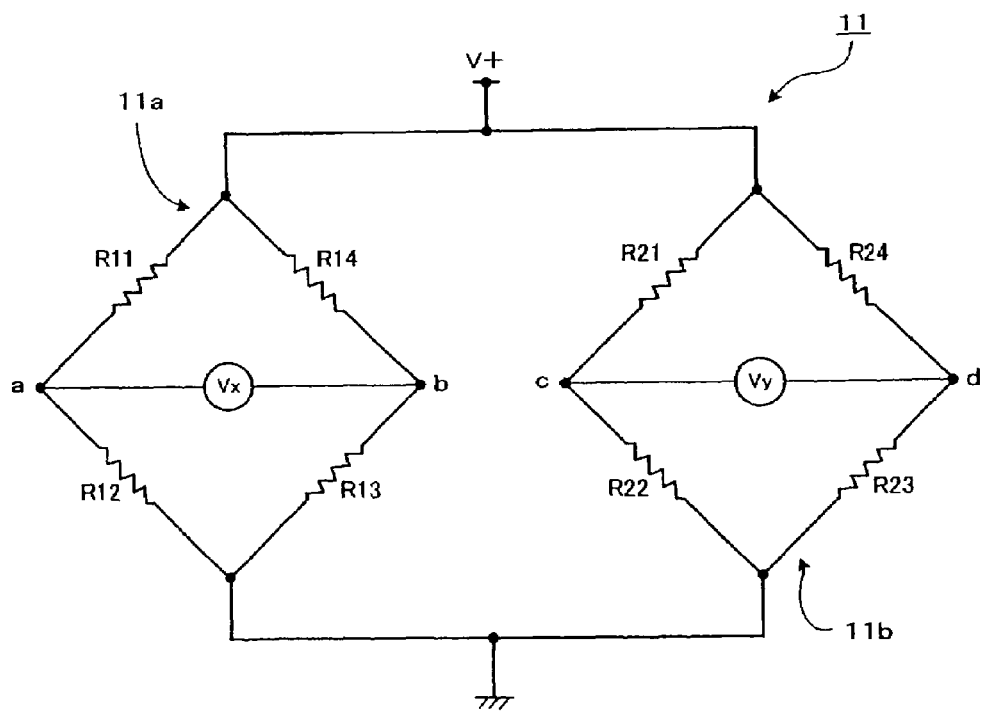
[FIG. 11]
A circuit diagram showing still another example of a bridge circuit.
Figure 12:
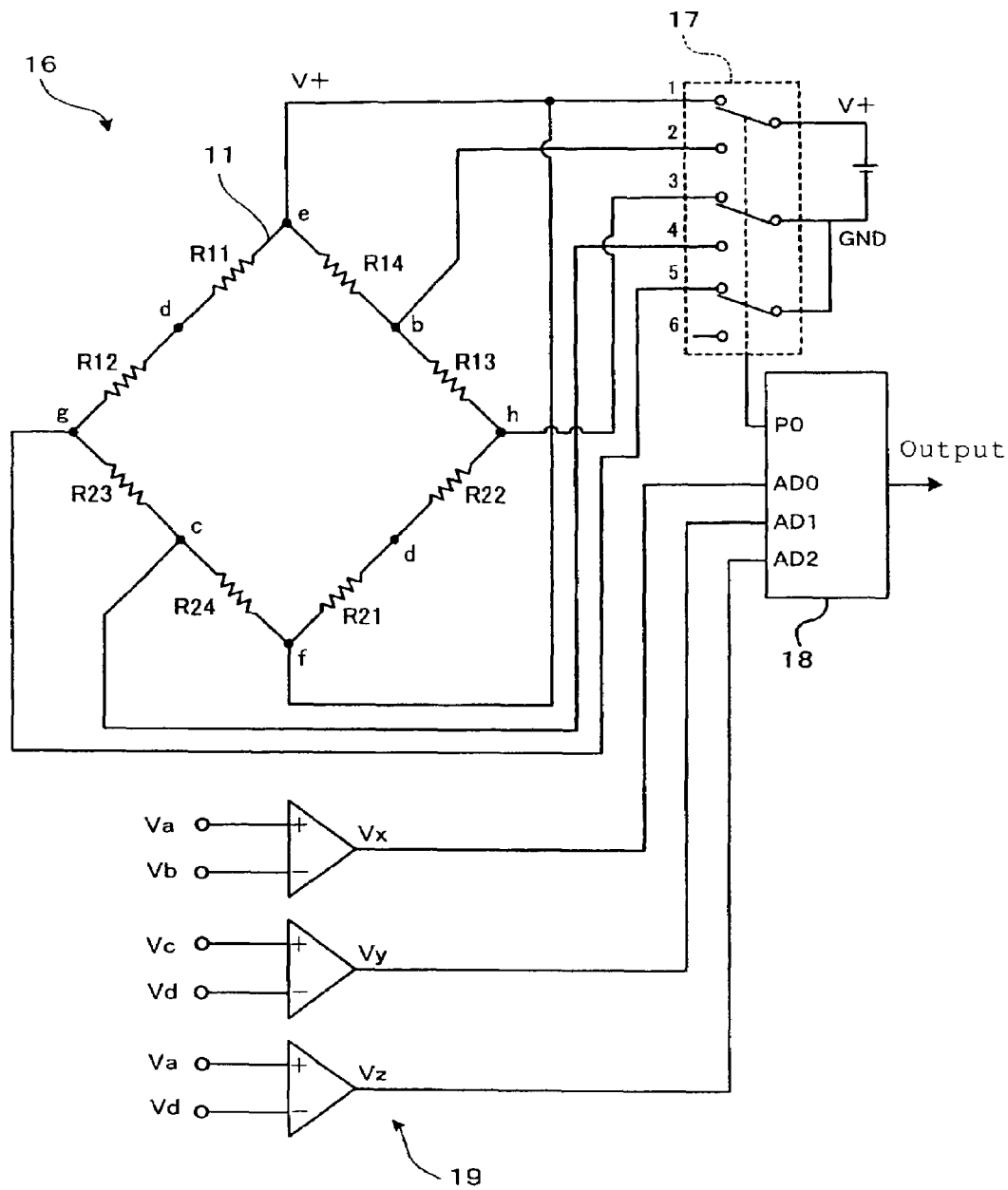
[FIG. 12]
A diagram showing an example of a detecting circuit.
Figure 13:
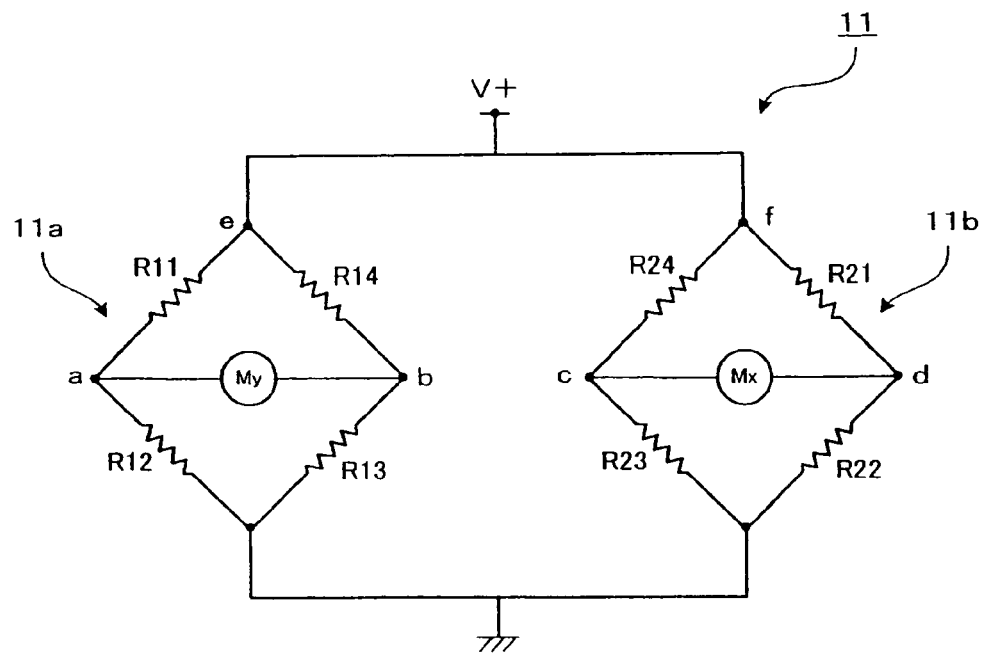
[FIG. 13]
A circuit diagram showing a bridge circuit formed when Mx or My is obtained by the detecting circuit.
Figure 14:
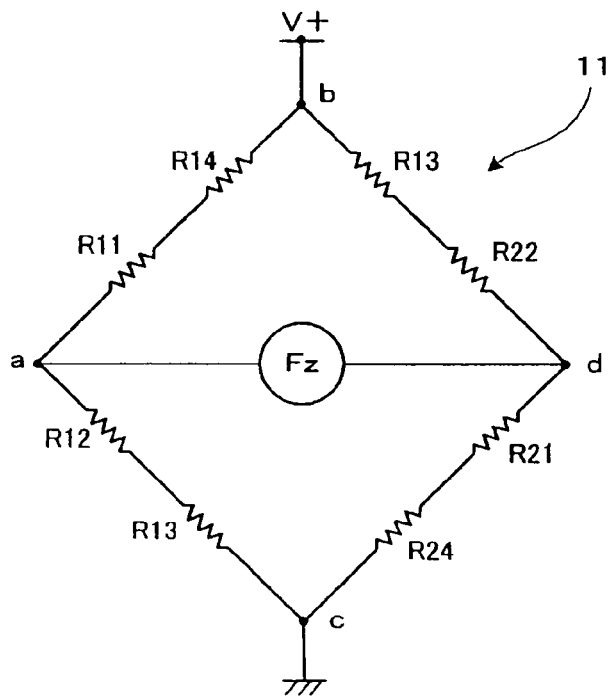
[FIG. 14]
A circuit diagram showing a bridge circuit formed when Fz is obtained by the detecting circuit.
Figure 15:
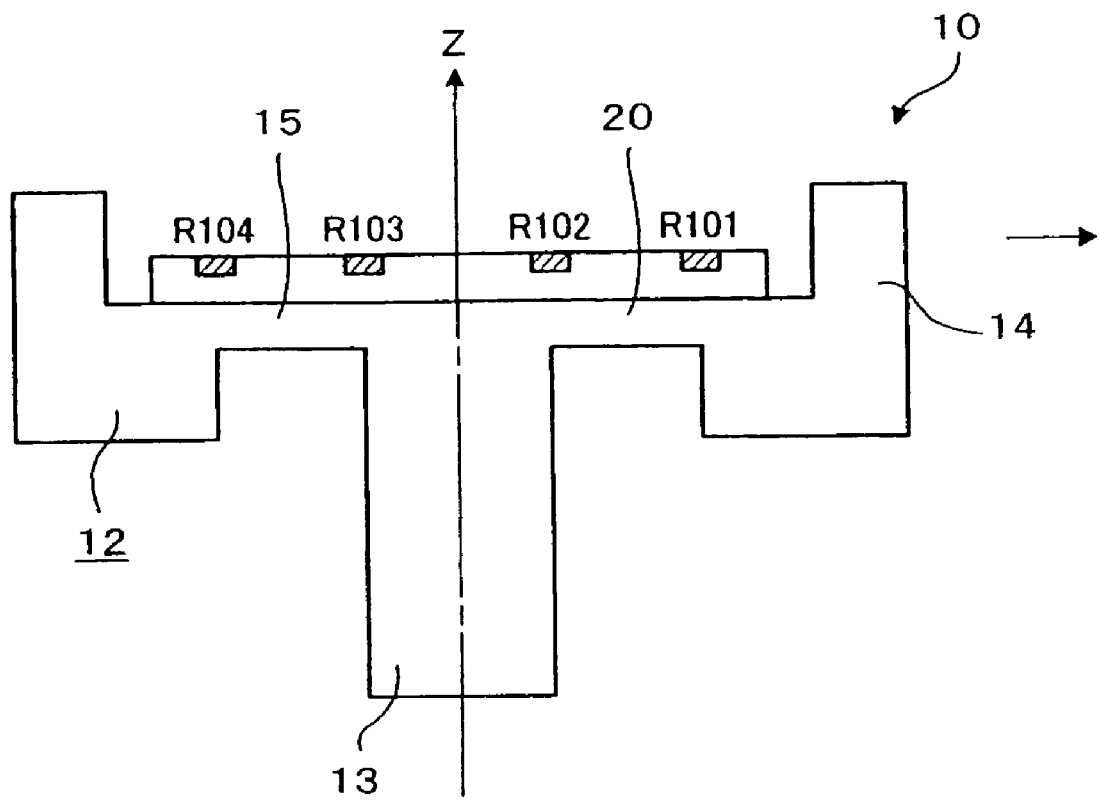
[FIG. 15]
A central vertical sectional front view of a multiaxial sensor unit according to a second embodiment.
Figure 16:
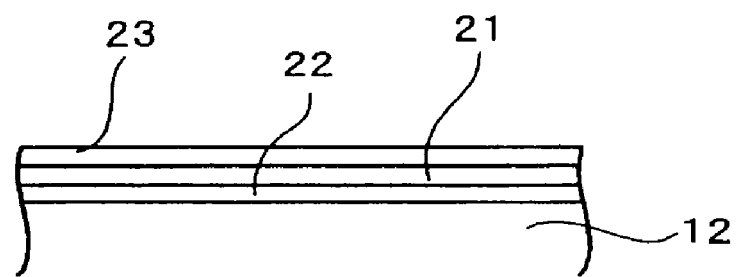
[FIG. 16]
A partially omitted vertical sectional view of a multiaxial sensor unit according to a third embodiment.
Figure 17A:
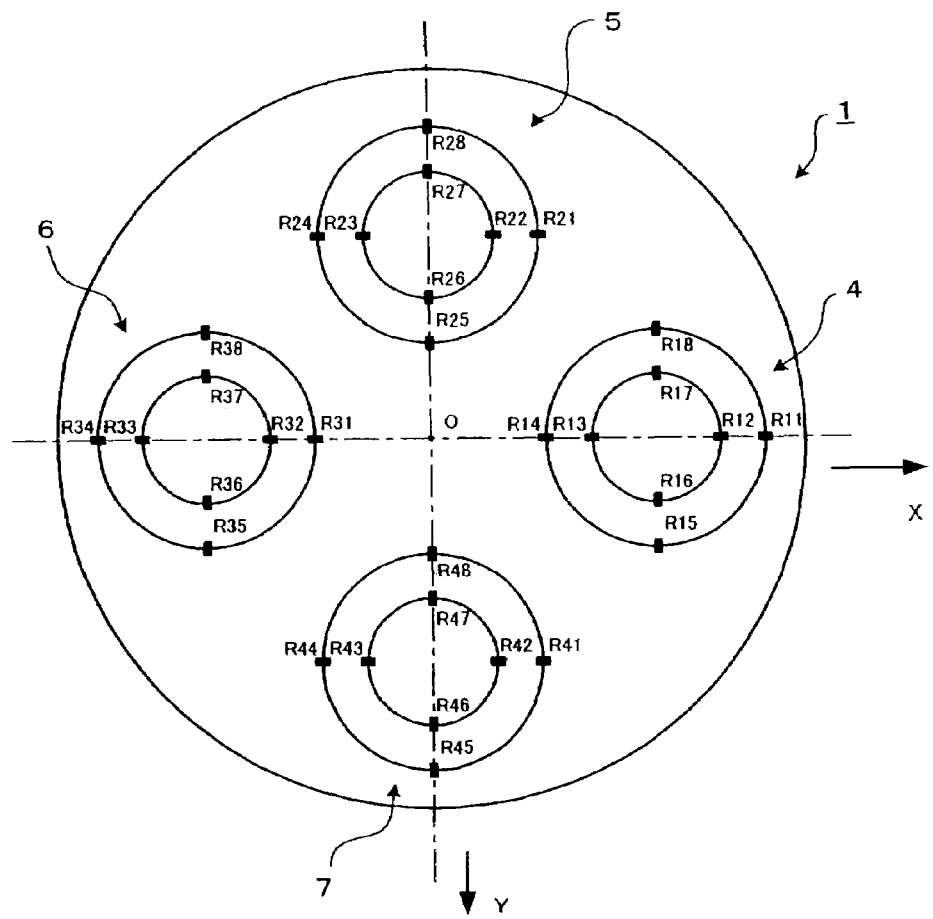
[FIG. 17A]
A plan view of a multiaxial sensor according to a fourth embodiment of the present invention, which shows arrangement of strain gauges when Z-axially transparently viewed from the position of a second member.
Figure 17B:
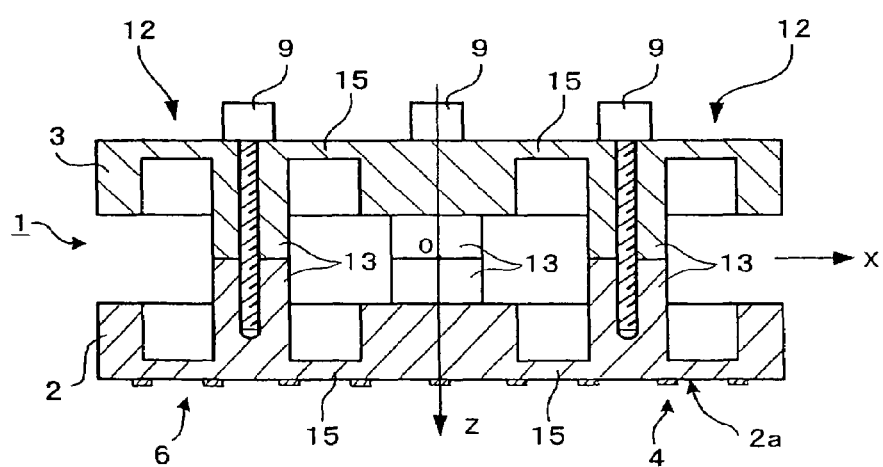
[FIG. 17B]
A central vertical sectional front view of the multiaxial sensor according to the fourth embodiment of the present invention.
Figure 18:
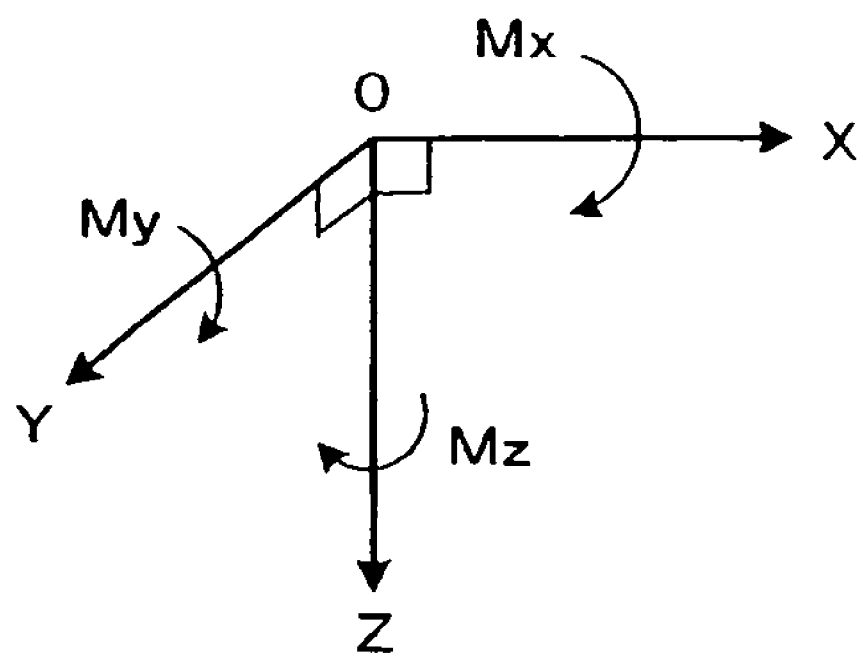
[FIG. 18]
A perspective representation showing axes of Cartesian coordinates.
Figure 19:
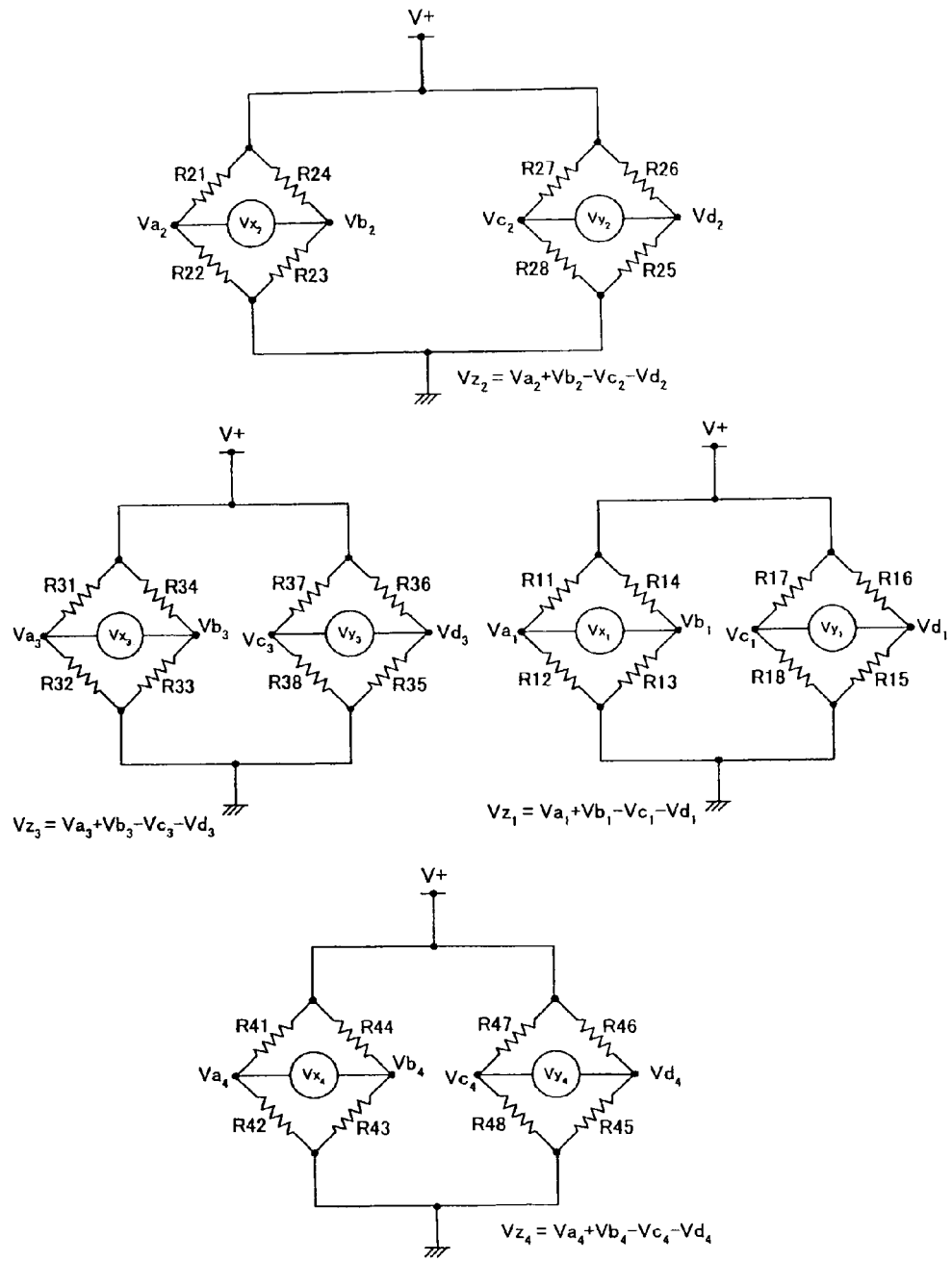
[FIG. 19]
Circuit diagrams showing examples of bridge circuits.
Figure 20:
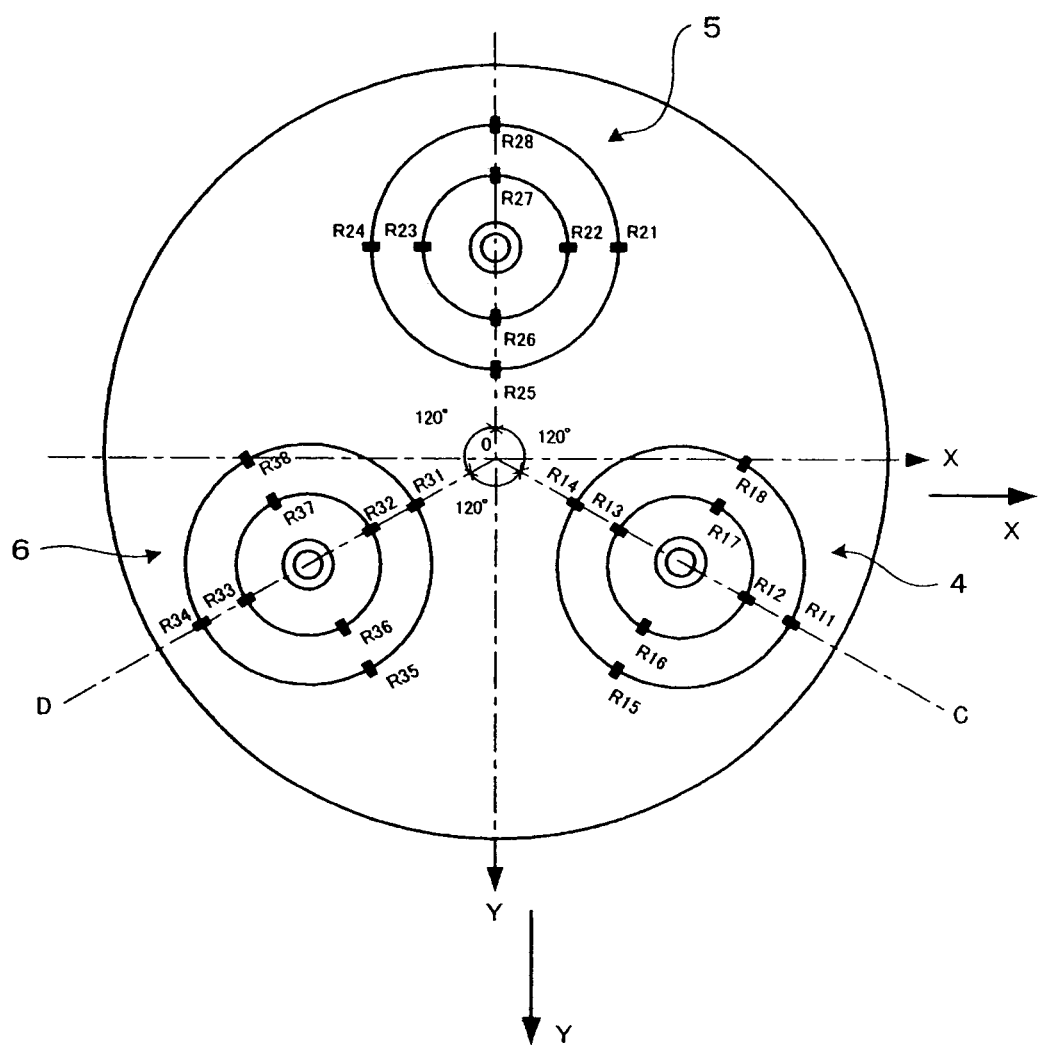
[FIG. 20]
A plan view of a multiaxial sensor according to a fifth embodiment, which shows arrangement of strain gauges when Z-axially transparently viewed from the position of a second member.
Figure 21:
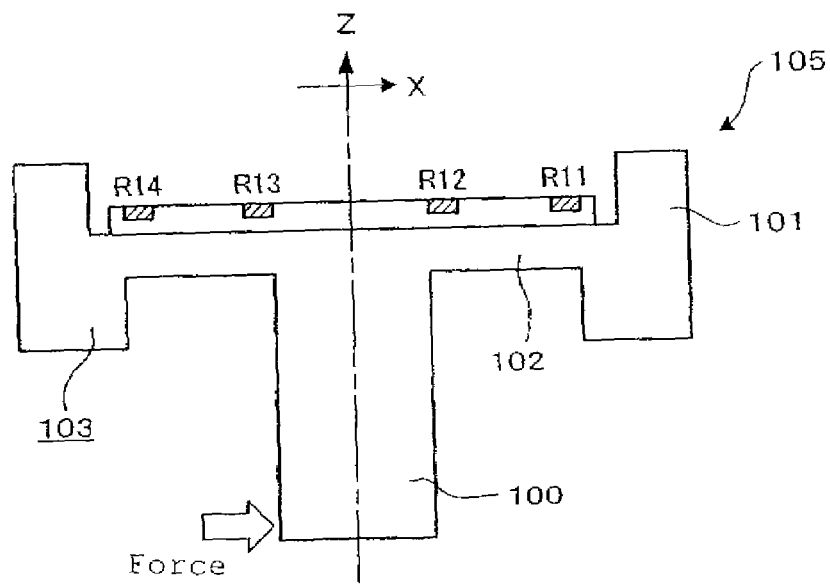
[FIG. 21]
A central vertical sectional front view of a prior art multiaxial sensor unit.
Figure 22:
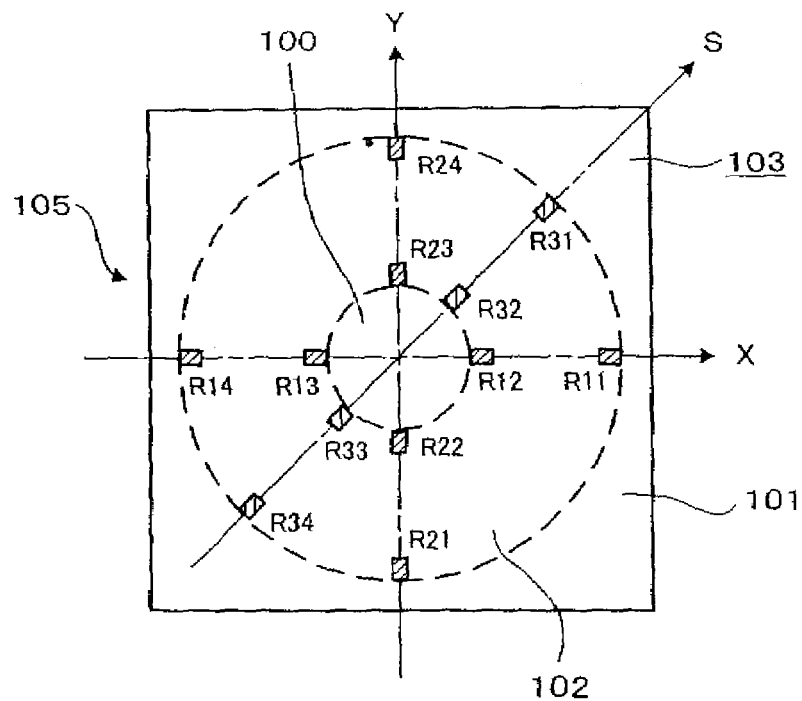
[FIG. 22]
A plan view showing arrangement of strain gauges of the prior art multiaxial sensor unit.
Figure 23C:
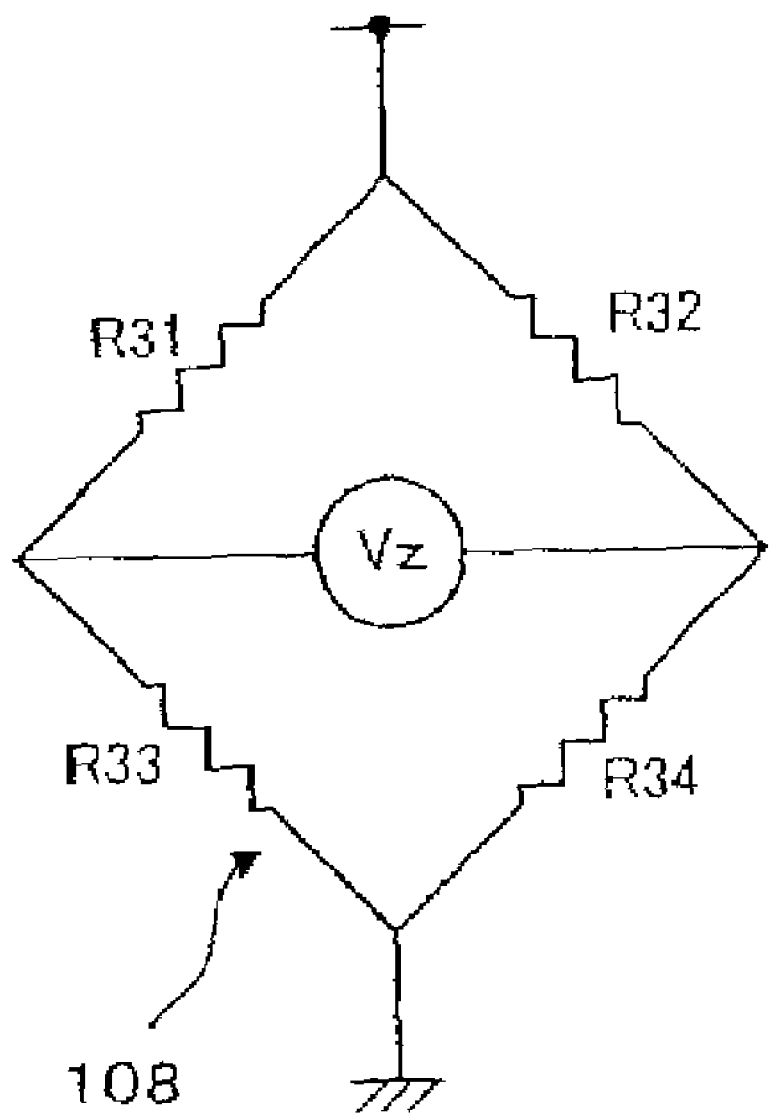
[FIG. 23C]
A circuit diagram showing a bridge circuit constituted by strain gauges of the prior art multiaxial sensor unit.

1: multiaxial sensor
2: first member
3: second member
4 to 7: multiaxial sensor unit 10: multiaxial sensor unit
11: bridge circuit
12: strain generation body
13: force receiving portion
14: fixed portion
15: diaphragm portion
R11 to R48: strain gauge

The invention claimed is:

1. A multiaxial sensor having a plurality of multiaxial sensor units for measuring one or more of two or more-axial force, moment, acceleration, and angular acceleration, externally applied, the plurality of multiaxial sensor units being disposed on a same plane and disposed around a center point of the multiaxial sensor at 90 degree intervals at the same distance from the center point, each of the multiaxial sensor units comprising:
   eight strain gauges disposed on a single plane;
   one bridge circuit constructed by connecting the strain gauges; and
   a strain generation body comprising a force receiving portion provided at a center, a fixed portion provided on an outer circumference, and an annular diaphragm portion connecting the force receiving portion and the fixed portion to each other;
   wherein the strain gauges being disposed at four positions on outer and inner edges of the diaphragm on a line perpendicular to a center line of the diaphragm, and at four positions on the outer and inner edges of the diaphragm on a line perpendicular to the line perpendicular to the center line of the diaphragm; and
   each of the strain gauges is a piezoresistive element or a strain gauge formed by sputtering.

2. The multiaxial sensor according to claim 1, wherein the multiaxial sensor units are disposed in positive and negative directions on X- and Y-axes with an origin being set at the center point.

3. The multiaxial sensor according to claim 1, wherein the eight strain gauges of each multiaxial sensor unit are disposed at four positions on outer and inner edges of the diaphragm on a line extending through a center point of the multiaxial sensor and a center point of each multiaxial sensor unit; and at four positions on the outer and inner edges of the diaphragm on a line perpendicular to the former line at the center point of the said multiaxial sensor unit.

4. The multiaxial sensor according to claim 1, wherein the sensor comprises a first member comprising the multiaxial sensor units each comprising the strain gauges; and a second member comprising strain generation bodies opposed to the multiaxial sensor units and comprising no strain gauges, and opposed force receiving portions of strain generation bodies are connected to each other, and multiaxial forces and moments applied between the first and second members are measured.

5. A multiaxial sensor having a plurality of multiaxial sensor units for measuring one or more of three or more-axial force, moment, acceleration, and angular acceleration, externally applied,
   the plurality of multiaxial sensor units being disposed on a same plane and disposed around a center point of the multiaxial sensor at regular angular intervals at the same distance from the center point,
   each of the multiaxial sensor units comprising:
   eight strain gauges disposed on a single plane;
   two bridge circuits constructed by connecting the strain gauges; and
   a strain generation body comprising a force receiving portion provided at a center, a fixed portion provided on an outer circumference, and an auntilar diaphragm portion connecting the force receiving portion and the fixed portion to each other;
   the strain gauges being disposed at four positions on outer and inner edges of the diaphragm on a line perpendicular to a center line of the diaphragm, and at four positions on the outer and inner edges of the diaphragm on a line perpendicular to the line perpendicular to the center line of the diaphragm;
   wherein each of the strain gauges is a piezoresistive element or a strain gauge formed by sputtering.

* * * * *